(12) United States Patent
Walsh

(10) Patent No.: US 7,987,816 B1
(45) Date of Patent: Aug. 2, 2011

(54) DUAL FUNCTION BOWL LIFTING AND FILLING APPARATUS WITH INTERCHANGEABLE CLEANING ATTACHMENT

(76) Inventor: Marjorie S. Walsh, Milpitas, CA (US)

( * ) Notice: Subject to any disclaimer, the term of this patent is extended or adjusted under 35 U.S.C. 154(b) by 0 days.

(21) Appl. No.: 11/821,369

(22) Filed: Jun. 21, 2007

Related U.S. Application Data

(63) Continuation-in-part of application No. 11/638,299, filed on Dec. 12, 2006, now abandoned.

(51) Int. Cl.
| | |
|---|---|
| A01K 5/01 | (2006.01) |
| A47L 13/20 | (2006.01) |
| B25G 1/04 | (2006.01) |
| B25G 1/00 | (2006.01) |
| B65B 39/00 | (2006.01) |
| F16B 21/02 | (2006.01) |

(52) U.S. Cl. .................... 119/61.56; 119/61.5; 15/144.1; 15/144.4; 15/145; 15/228; 15/229.6; 141/340; 141/344; 403/348

(58) Field of Classification Search ................. 119/61.5, 119/61.56, 53, 56.1; 141/18, 230, 312, 323, 141/324, 328, 383, 384, 386, 340, 344; 47/48.5, 47/40.5; 403/348, 350, 351; 15/143.1, 144.1, 15/144.2, 144.3, 144.4, 145, 228, 229.1, 15/229.6, 229.7, 229.8, 229.9

See application file for complete search history.

(56) References Cited

U.S. PATENT DOCUMENTS

| 410,658 A * | 9/1889 | Stewart ........................... 141/18 |
|---|---|---|
| D51,709 S | 1/1918 | Wyatt |
| 1,383,368 A | 7/1921 | Ambrose |
| 1,586,676 A | 6/1926 | Heath |
| D158,596 S | 5/1950 | Lack ................................ D35/2 |
| 2,576,154 A | 11/1951 | Trautvetter |
| 2,809,468 A | 10/1957 | Eliot .................................. 47/44 |
| 2,904,292 A * | 9/1959 | Clouthier ........................ 47/40.5 |
| 3,016,202 A | 1/1962 | Zalewski ........................ 239/542 |
| 3,133,566 A * | 5/1964 | Hoss ............................. 141/350 |
| 3,471,968 A | 10/1969 | Letz .................................. 47/47 |
| 4,381,623 A | 5/1983 | Koistinen ....................... 47/48.5 |
| 4,393,622 A | 7/1983 | Gallo, Sr. ....................... 47/48.5 |
| 4,573,434 A | 3/1986 | Gardner .......................... 119/77 |
| 5,004,024 A * | 4/1991 | Rezmer et al. ................. 141/298 |
| 5,081,957 A | 1/1992 | Warner, Jr. ...................... 119/61 |
| 5,149,149 A * | 9/1992 | Wu ................................ 285/402 |
| D331,865 S | 12/1992 | Parker ............................... D8/1 |
| D346,098 S | 4/1994 | Schweiker, Jr. ................... D8/1 |
| 5,349,997 A | 9/1994 | Rial ............................... 141/331 |
| D353,186 S | 12/1994 | Browning ................... D23/213 |

(Continued)

FOREIGN PATENT DOCUMENTS

WO  WO 2006114464 A1 * 11/2006

*Primary Examiner* — Kimberly S Smith
*Assistant Examiner* — Joseph W Sanderson
(74) *Attorney, Agent, or Firm* — Haverstock & Owens LLP

(57) ABSTRACT

The dual function bowl lifting and filling apparatus of the present invention allows a user to clean or fill a surface laying bowl with fluid or food, or to lift or move the apparatus without bending. Specific designs are utilized to enable the dual function bowl lifting and filling apparatus to be used by people with special needs. The bowl-filling apparatus also allows excess fluid to be stored in the apparatus. A method of filling a surface-laying bowl is disclosed as well as a method for storing excess fluid in a bowl-filling apparatus.

16 Claims, 28 Drawing Sheets

U.S. PATENT DOCUMENTS

| | | | |
|---|---|---|---|
| 5,473,838 A | 12/1995 | Denbigh | 47/40.5 |
| 5,669,178 A | 9/1997 | Petrovic | 47/40.5 |
| 5,685,351 A * | 11/1997 | Kazarian et al. | 141/325 |
| 5,687,783 A | 11/1997 | Finnegan | 141/364 |
| 5,692,856 A * | 12/1997 | Newman et al. | 403/352 |
| 5,720,329 A | 2/1998 | Clarke, Jr. | 141/331 |
| D398,492 S | 9/1998 | Weber | D8/1 |
| 5,806,240 A | 9/1998 | Racine | 47/79 |
| D405,561 S | 2/1999 | Willinger et al. | D30/129 |
| 5,867,929 A * | 2/1999 | Jung et al. | 47/40.5 |
| D406,926 S | 3/1999 | Kolozsvari | D30/132 |
| 5,887,545 A | 3/1999 | Cuttress | 119/61 |
| 5,894,695 A * | 4/1999 | Stellatos | 47/40.5 |
| 5,901,497 A | 5/1999 | Bulvin | 47/48.5 |
| 5,979,361 A | 11/1999 | Willinger | 119/61 |
| 6,079,361 A | 6/2000 | Bowell et al. | 119/72 |
| 6,082,043 A * | 7/2000 | Andrews | 47/40.5 |
| D431,978 S | 10/2000 | Mayhill | D8/1 |
| 6,138,852 A * | 10/2000 | Miura et al. | 220/86.2 |
| D434,283 S | 11/2000 | Dewey | D8/1 |
| 6,145,250 A | 11/2000 | Mai | 47/79 |
| 6,185,866 B1 * | 2/2001 | Enfaradi | 47/79 |
| D446,362 S | 8/2001 | Choi et al. | D30/129 |
| 6,322,284 B1 * | 11/2001 | Bonardo et al. | 403/348 |
| 6,330,956 B1 | 12/2001 | Willinger | 220/574 |
| D453,895 S | 2/2002 | Dewey | D8/1 |
| 6,453,607 B1 | 9/2002 | Dewey | 47/48.5 |
| 6,516,747 B1 | 2/2003 | Willinger | 119/61 |
| 6,681,719 B1 * | 1/2004 | Warner | 119/61.56 |
| 6,745,991 B1 * | 6/2004 | Rush | 248/523 |
| 6,848,483 B1 * | 2/2005 | Atkinson et al. | 141/198 |
| 6,863,025 B2 | 3/2005 | Ness | 119/72 |
| 6,868,801 B2 * | 3/2005 | Rovira Badia et al. | 119/51.5 |
| D507,027 S | 7/2005 | Hale, Jr. | D21/722 |
| 6,953,007 B1 | 10/2005 | Cummings | 119/712 |
| 6,971,331 B1 | 12/2005 | Rohrer | 119/77 |
| 7,040,249 B1 | 5/2006 | Mushen | 119/51.5 |
| 7,077,074 B2 | 7/2006 | Polimeni, Jr. | 119/61.56 |
| 7,096,531 B2 * | 8/2006 | Policicchio | 15/228 |
| 7,198,080 B2 * | 4/2007 | Foust | 141/386 |
| 7,244,201 B2 | 7/2007 | Hale | 473/560 |
| 2002/0072436 A1 | 6/2002 | Liu | 473/457 |
| 2003/0001398 A1 * | 1/2003 | Koeniger | 292/288 |
| 2003/0056730 A1 * | 3/2003 | Corti et al. | 119/53 |
| 2003/0168016 A1 | 9/2003 | Zolnierz et al. | 119/61 |
| 2003/0231502 A1 | 12/2003 | Smith | 362/401 |
| 2006/0168878 A1 * | 8/2006 | Brandes | 47/40.5 |
| 2006/0231039 A1 | 10/2006 | Abinanti et al. | 119/61.56 |
| 2006/0283397 A1 * | 12/2006 | Loeffelholz | 119/61.56 |
| 2006/0288946 A1 * | 12/2006 | Brillon | 119/61.56 |
| 2008/0092440 A1 | 4/2008 | Johnson | 47/48.5 |
| 2008/0155893 A1 * | 7/2008 | Ensenat De Carlos et al. | 47/48.5 |

* cited by examiner

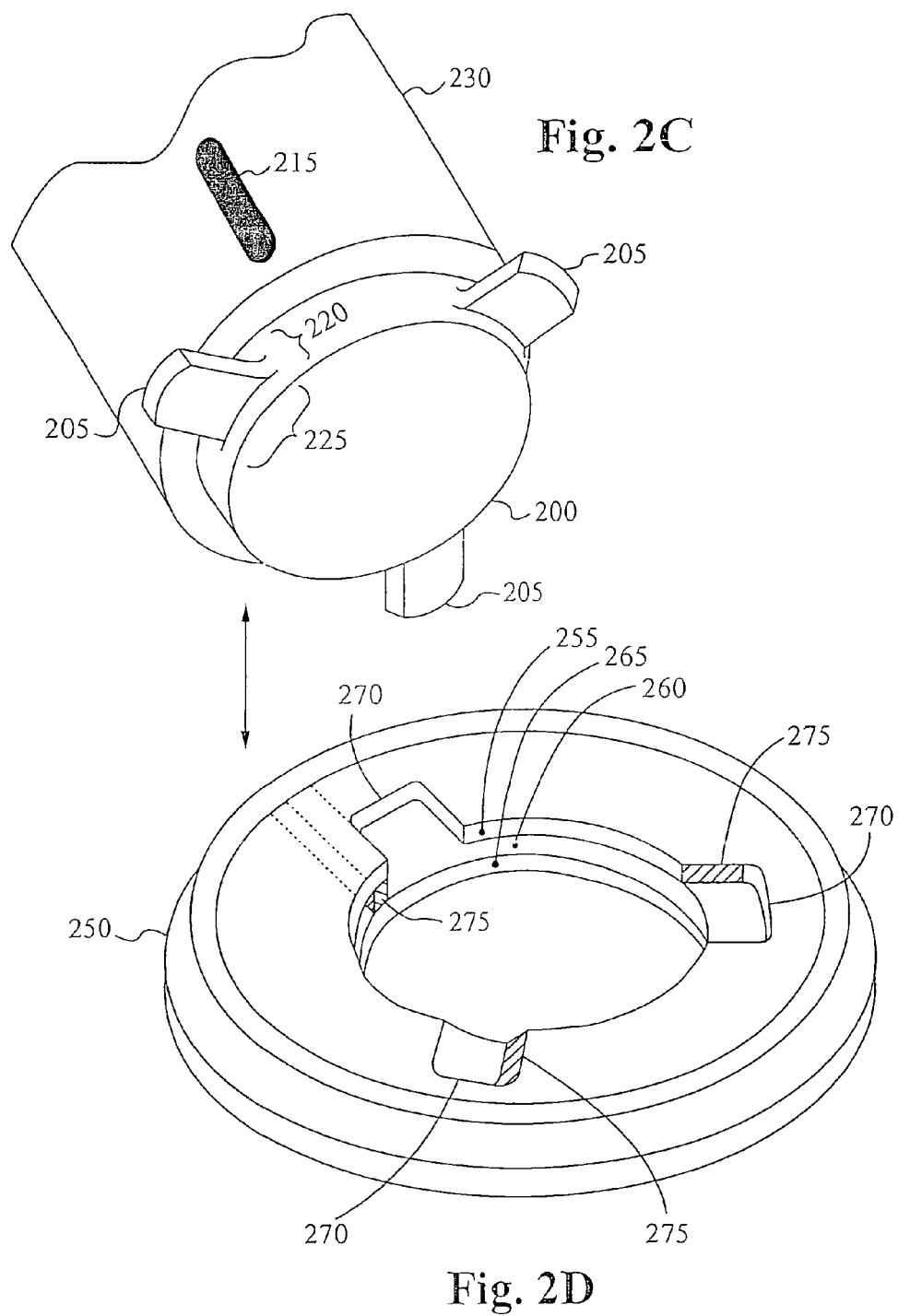

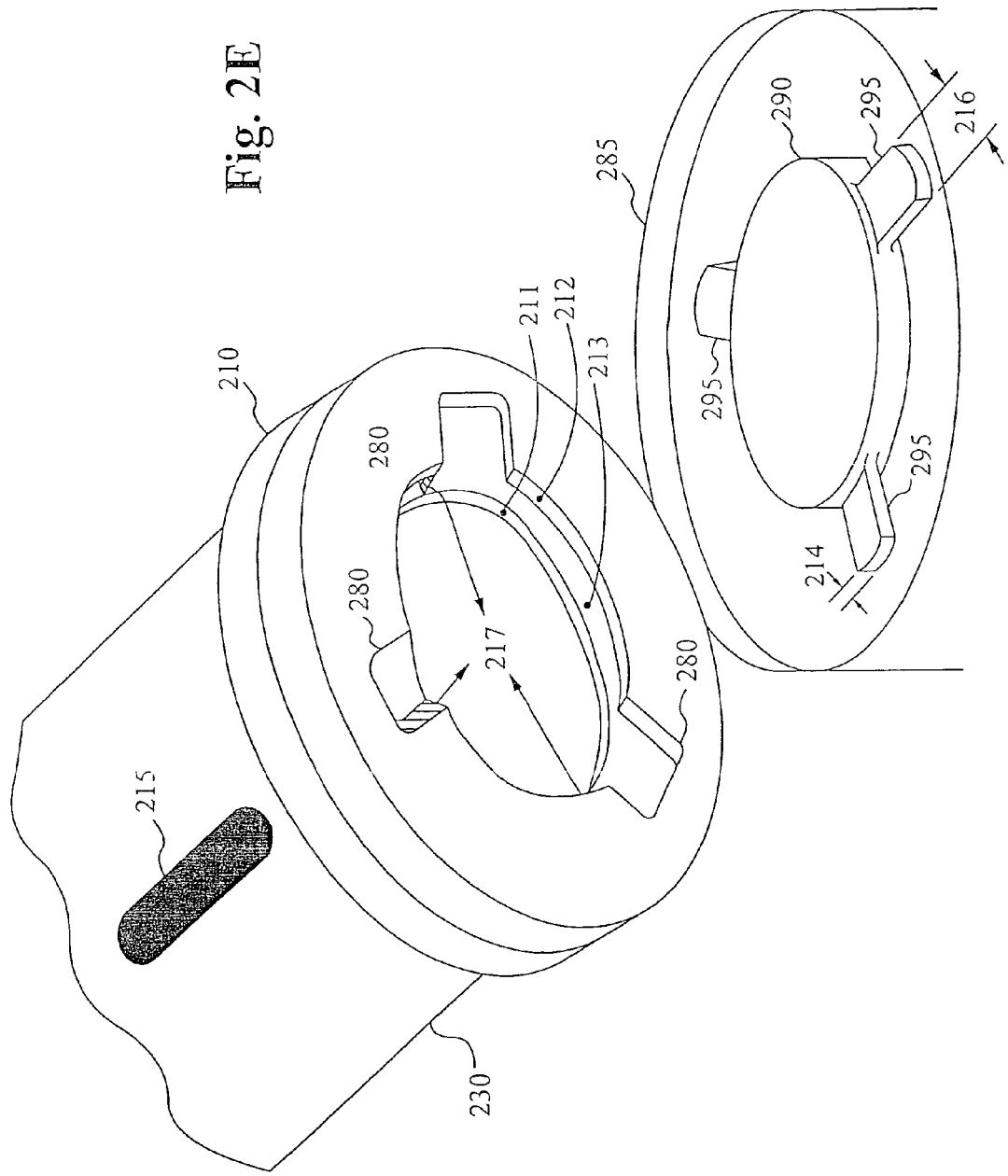

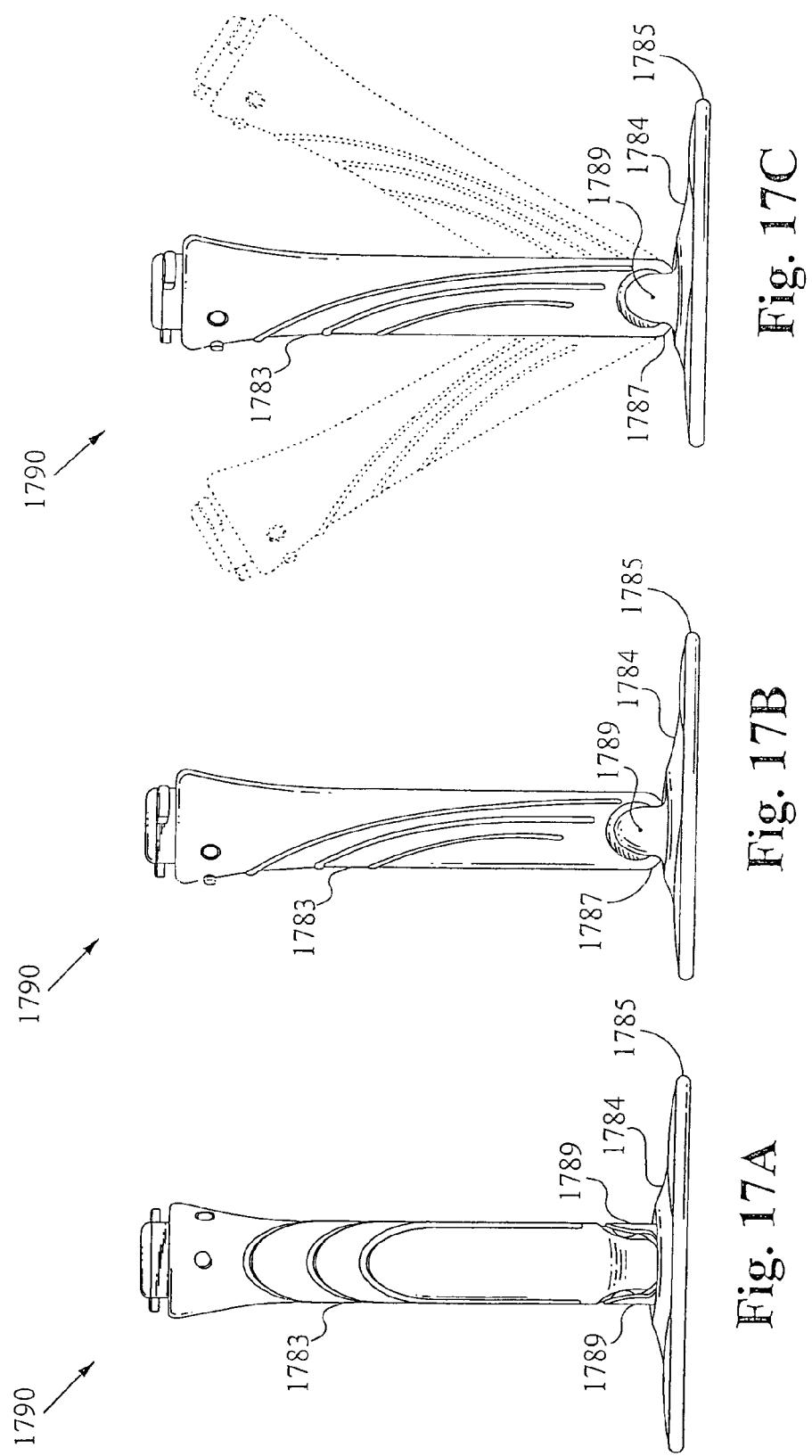

US 7,987,816 B1

DUAL FUNCTION BOWL LIFTING AND FILLING APPARATUS WITH INTERCHANGEABLE CLEANING ATTACHMENT

RELATED APPLICATIONS

This Patent application is a continuation-in-part of U.S. patent application Ser. No. 11/638,299 filed on Dec. 12, 2006 now abandoned and entitled "DUAL FUNCTION BOWL LIFTING AND FILLING APPARATUS", which is hereby incorporated by reference.

FIELD OF THE INVENTION

The present invention is related to bowl lifting and filling apparatuses. More specifically, the invention relates to apparatuses for lifting, moving, filling and cleaning a bowl without bending.

BACKGROUND

Pet owners frequently need to provide fluid and dispense food to their pets to ensure the animal's health. Attempts to make fluid delivery easier typically include a low-laying bowl with a fluid reservoir. However, these various attempts to ease the delivery of water have failed to consider users who lack the ability to lift heavy fluid reservoirs or the ability to bend over to attach a reservoir or to fill a bowl.

SUMMARY OF THE DISCLOSURE

Embodiments of the present invention are directed to a multi function bowl filling, lifting, moving and cleaning apparatus which allows a user to fill a surface-laying bowl from a vertically elevated position without bending and to pick up the bowl to move it, clean it or to fill it with food or water without bending. The bowl-filling apparatus comprises a tube that is configured to accept fluid in the top end and transfer the fluid down through the body and out an aperture where it is received in the bowl below. The tube also functions to allow the user to lift the bowl off a surface and move it, clean it or fill it with food without bending. In certain embodiments an anti-slip surface on the body of the tube or a handle on the top end of the tube helps to facilitate ease of lifting and moving the apparatus.

In some embodiments the top end of the tube has a flared opening. In some embodiments the top end of the tube is detachable. The detachable top end of the tube has a sealable bottom in some embodiments. In one embodiment, a filling cup is used to fill the top end.

In some embodiments, the body portion of the tube has an intermediate section which alternatively seals the body from atmospheric pressure which allows fluid to be stored in the body portion. The bottom of the body portion also includes a coupling socket which couples with a coupling plug in the bowl.

In some embodiments of the present invention, a number of attachments couple with the body portion of the apparatus to serve as an arm for remote manipulation of spilled water, food, pet hair or lint.

BRIEF DESCRIPTION OF THE DRAWINGS

The novel features of the invention are set forth in the appended claims. However, for purpose of explanation, several embodiments of the invention are set forth in the following figures.

FIG. 2C is a perspective view of one example of a coupling plug with three coupling wings according to some embodiments of the present invention.

FIG. 2D is a perspective view of one example of a coupling socket with three coupling wing sockets according to some embodiments of the present invention.

FIG. 2E is a perspective view of one example of a coupling socket and a coupling plug integrally formed in the bowl according to some embodiments of the present invention.

FIG. 17A illustrates a front view of the bottom section of the bowl lifting, filling and cleaning apparatus according to some embodiments of the present invention.

FIG. 17B illustrates a side view of the bottom section of the bowl lifting, filling and cleaning apparatus according to some embodiments of the present invention.

FIG. 17C illustrates a side view of the bottom section of the bowl lifting, filling and cleaning apparatus detailing axial movement features according to some embodiments of the present invention.

DETAILED DESCRIPTION

In the following description, numerous details are set forth for purpose of explanation. However, one of ordinary skill in the art will realize that the invention may be practiced without the use of these specific details.

Figure 1A:
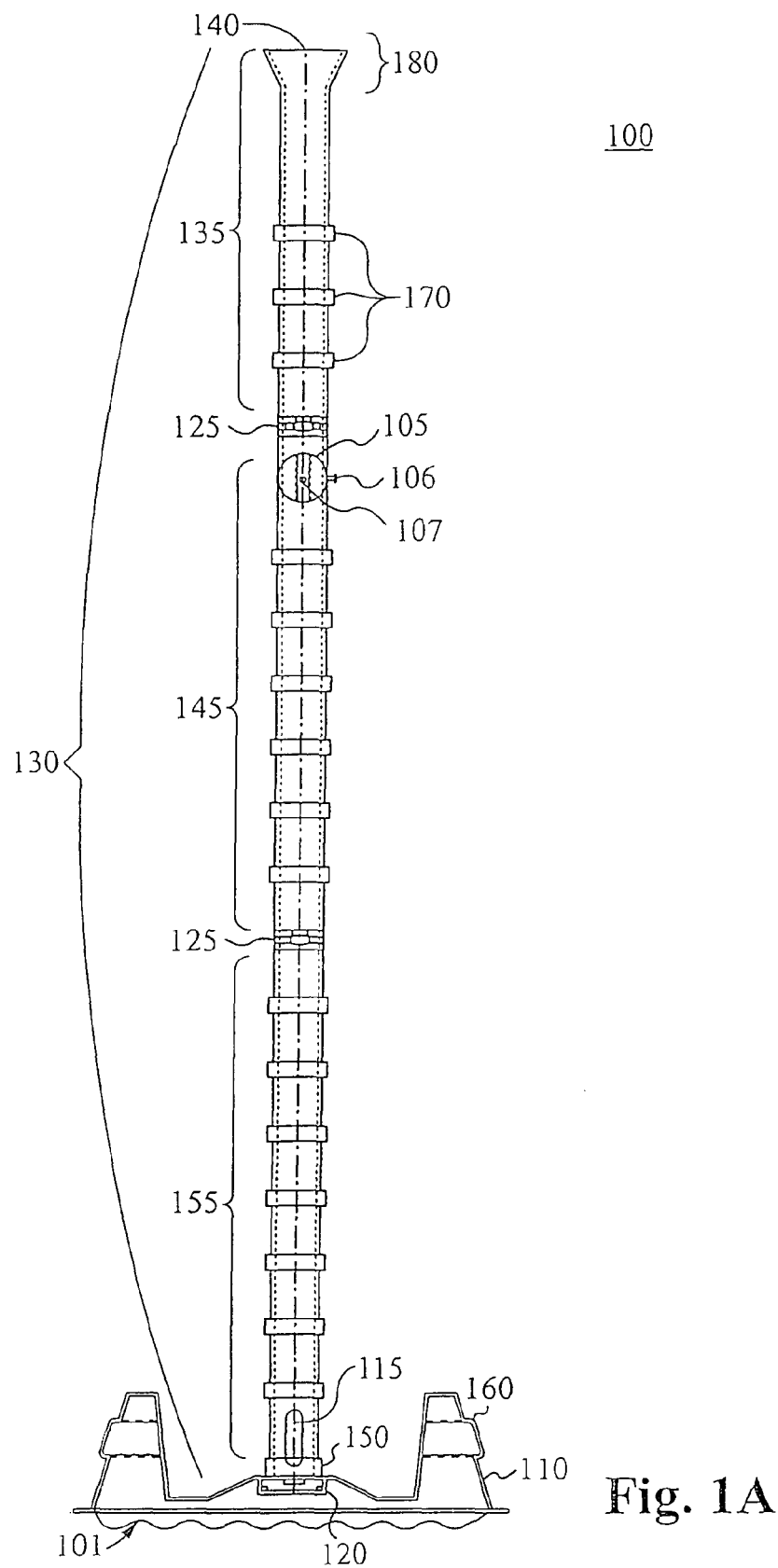
FIG. 1A provides a side cut-away view showing one embodiment of the bowl filling apparatus of the present invention.

FIG. 1A provides a side cut-away view showing one embodiment of the bowl filling apparatus of the present invention. The particular embodiment shown at 100 is used for providing water to a pet without having to bend down, for lifting and accessing the bowl for cleaning and for moving the bowl without bending. FIG. 1A shows a bowl 110 removably coupled with a body portion 130. The body portion 130 has a top end for fluid intake 140 and a bottom end with a coupling plug 150. The bowl 110 has a coupling socket 120 which couples with the coupling plug 150. In one embodiment of the present invention, the coupling socket is integrally formed with the bowl. Alternatively, the coupling socket is removable. The body portion 130 is also configured with at least one aperture 115 to allow fluid to pour into the bowl 110. As shown in FIG. 1A, the at least one aperture can be located above the coupling socket. However, it will be clear to those skilled in the art that apertures 115 can be positioned on the coupling socket, or anywhere else on the body portion.

The body portion of the bowl filling apparatus of the present invention is a hollow elevating body configured to accommodate and transfer fluid from some elevated vertical height. In some embodiments of the present invention, the body portion 130 extends vertically up from the bowl 110 to a height that is approximately at the waist level of a user, however other appropriate heights are contemplated. Without bending over, the user pours fluid into the fluid intake 140. The fluid then travels down the body portion 130 due to the force of gravity. When the fluid reaches the bottom of the body portion 130 it pours out of the aperture 115 and into the bowl 110. In some embodiments of the present invention, the bowl filling apparatus has a flared fluid intake opening 180 on the top.

Additionally, when the vertical body portion 130 is coupled with the bowl 110, the bowl is able to be lifted by a user without bending. In some embodiments of the present invention, the body portion 130 is configured to prevent the apparatus from slipping from a user's grip. As shown in FIG. 1A, anti-slip ribs 170 are positioned along the body portion 130 to prevent slipping. However, other means for preventing slipping are contemplated. In one embodiment of the present invention, the bowl filling apparatus includes a grip ring 160 positioned around the bowl 110. The grip ring allows easy transport of the apparatus. In some embodiments of the present invention, the bowl 110 has a non-slip surface 101 on the bottom to ensure that the bowl does not move around when coupling the body portion 130 to the bowl 110.

In some embodiments of the present invention, the body portion 130 is made up of one continuous section. However, the body portion could be made up of any number of sections. Constructing the apparatus with discrete sections allows easy transportation and storage of the apparatus. Furthermore, discrete sections allows the apparatus to be adjusted to various heights to allows users of various heights to use the apparatus without bending and to transport the device.

In the embodiment shown in FIG. 1A, the body portion is made up of three sections: 135, 145, and 155. The top section 135 is configured with the fluid intake 140 on the top, and the male end of a joint mechanism 125 on the bottom. The middle section 145 is configured with the female end of a joint mechanism 125 on the top, and the male end of a joint mechanism 125 on the bottom. Finally, the bottom section 155 is configured with the female end of the joint mechanism on the top and the male end of the joint mechanism 125 on the bottom. In some embodiments, the male end of the joint mechanism 125 is the same mechanism as the coupling plug 150 that couples with the coupling socket 120 in the bowl 110. In some embodiments the joint mechanism 125 is a threaded male end and a thread accepting female end.

Another advantage to using interchangeable sections is that the apparatus is customizable based on the height of the user. A shorter user will take out the middle section 145 to bring down the level of the fluid intake 140. Likewise a taller user can chose to include additional sections to bring the fluid intake 140 of the apparatus to a convenient height. The configuration above describing the orientation of the joint mechanisms is meant to serve as an illustration of one possible configuration. However, any other configuration is contemplated.

In some embodiments of the present invention, a valve 105 is situated on the body portion 130 to start and stop the flow of fluid therethrough. As shown, the valve 105 is turned via an external handle 106. When the handle 106 of the valve 105 is in the vertical position shown, fluid flows through the conduit 107. When the handle 106 of the valve 105 is turned, so that the handle 106 is in a horizontal position, fluid flow is cut off. In use, a user ensures that the flow is turned off, fills the top section 135 with fluid and then opens the flow of fluid by turning the external handle 106. Once an appropriate amount of fluid has flowed through the valve 105, the user turns the external handle 106 back to stop fluid flow.

Figure 1B:
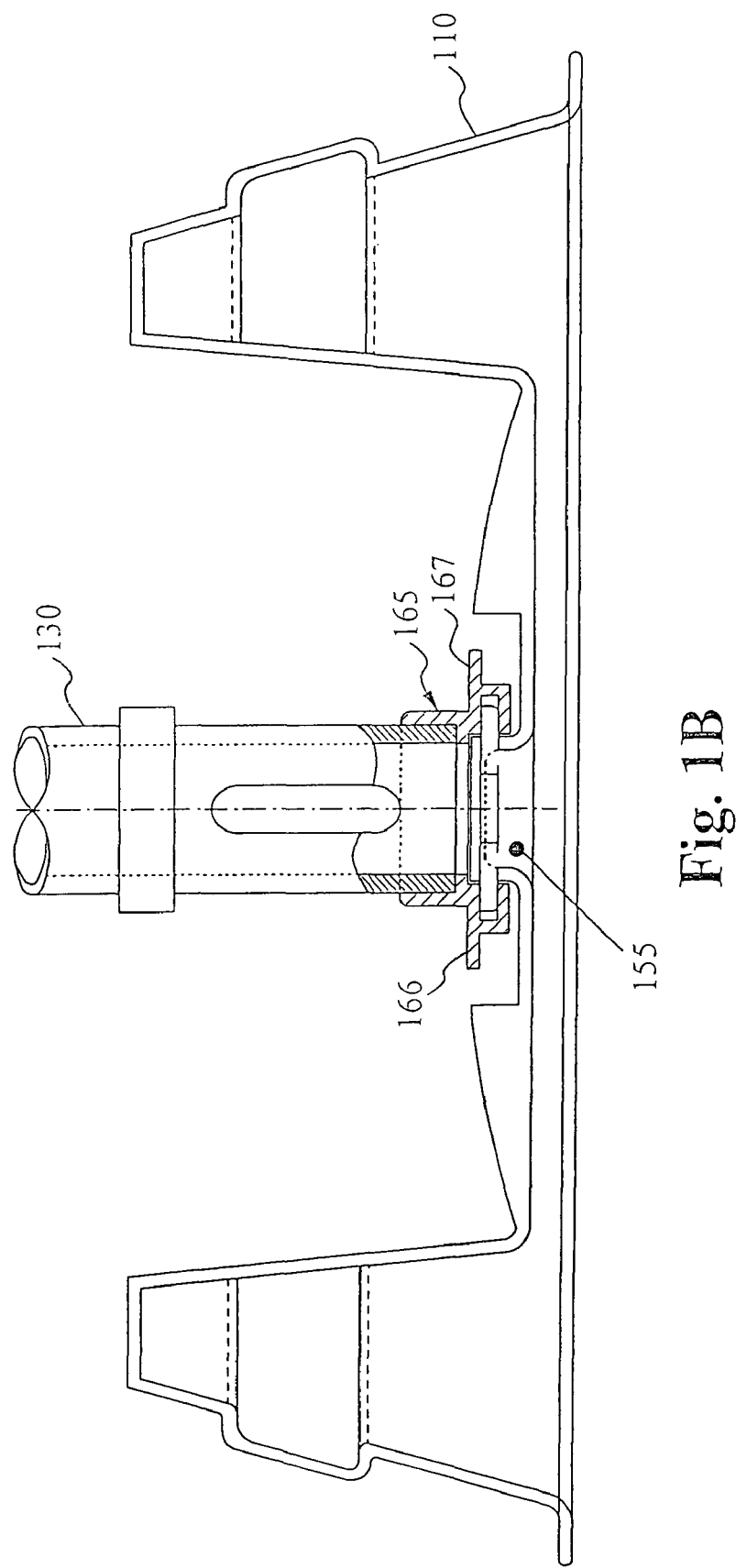
FIG. 1B provides a detailed side cut-away view showing the coupling mechanism of one embodiment of the bowl filling apparatus of the present invention.

FIG. 1B is a side cut-away detailed view showing another embodiment of the bowl filling apparatus of the present invention. In this configuration the positions of the coupling plug 155 and the coupling socket 165 are switched from their positions in FIG. 1A. Here, the bottom end of the body portion has a coupling socket 165. The bowl 110 has a coupling plug 155 which couples with the coupling socket 165. The coupling socket 165 has horizontally extending arms 166, 167. In some embodiments of the present invention, the coupling plug 155 is integrally formed with the bowl 110 and is inlayed in the bowl 110. With the coupling plug 155 inlayed in the bowl 110, a pet is less able to chew and injure their teeth on the coupling plug 155 when eating from the bowl 110 when the body portion 130 is not coupled to the bowl 110.

Figure 1C:
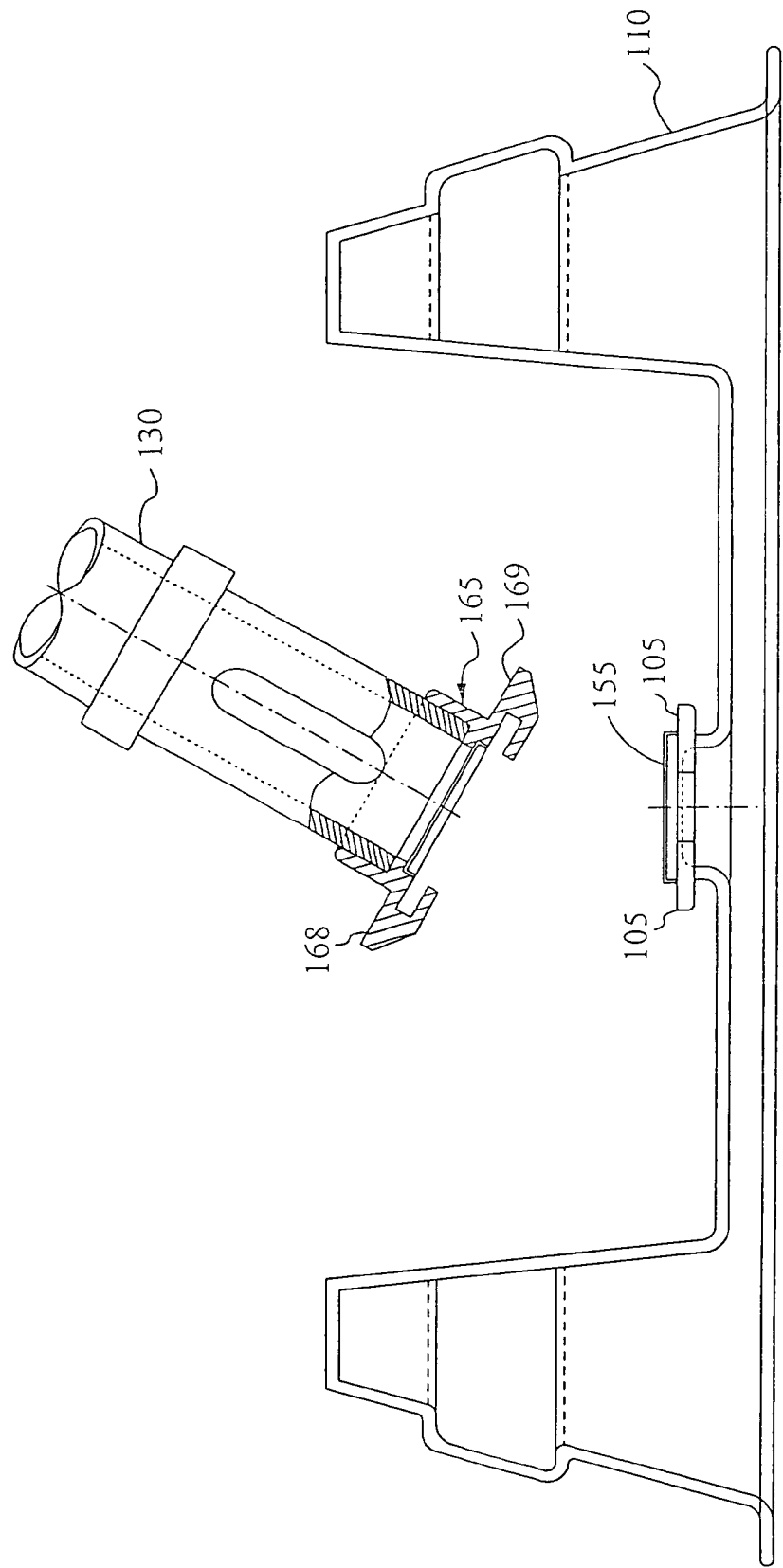
FIG. 1C provides a detailed side cut-away view showing the coupling mechanism with flared edges according to one embodiment of the bowl filling apparatus of the present invention.

FIG. 1C is a side cut-away detailed view showing yet another embodiment of the bowl filling apparatus of the present invention with the coupling socket 165 and coupling plug 155 un-coupled. The coupling plug 155 has coupling wings 105. The horizontally extending arms 168, 169 of the coupling socket 165 have flared edges which angle down toward the bottom. These arms 168, 169 are configured to provide a scraping mechanism to scrape the underside of the coupling wings 105 and to free any food residue or other particles which might have collected there.

As illustrated in FIG. 1C, a user lines up the body portion 130 of the apparatus having a coupling socket 165 with the coupling plug 155. In one embodiment of the present invention, the coupling socket 165 is clear plastic. A clear plastic construction enables a user to see through part of the coupling socket and to see the coupling plug when trying to couple the pieces. In some embodiments the coupling plug 155 is a dark plastic and the coupling socket is a clear plastic.

Figure 1D:
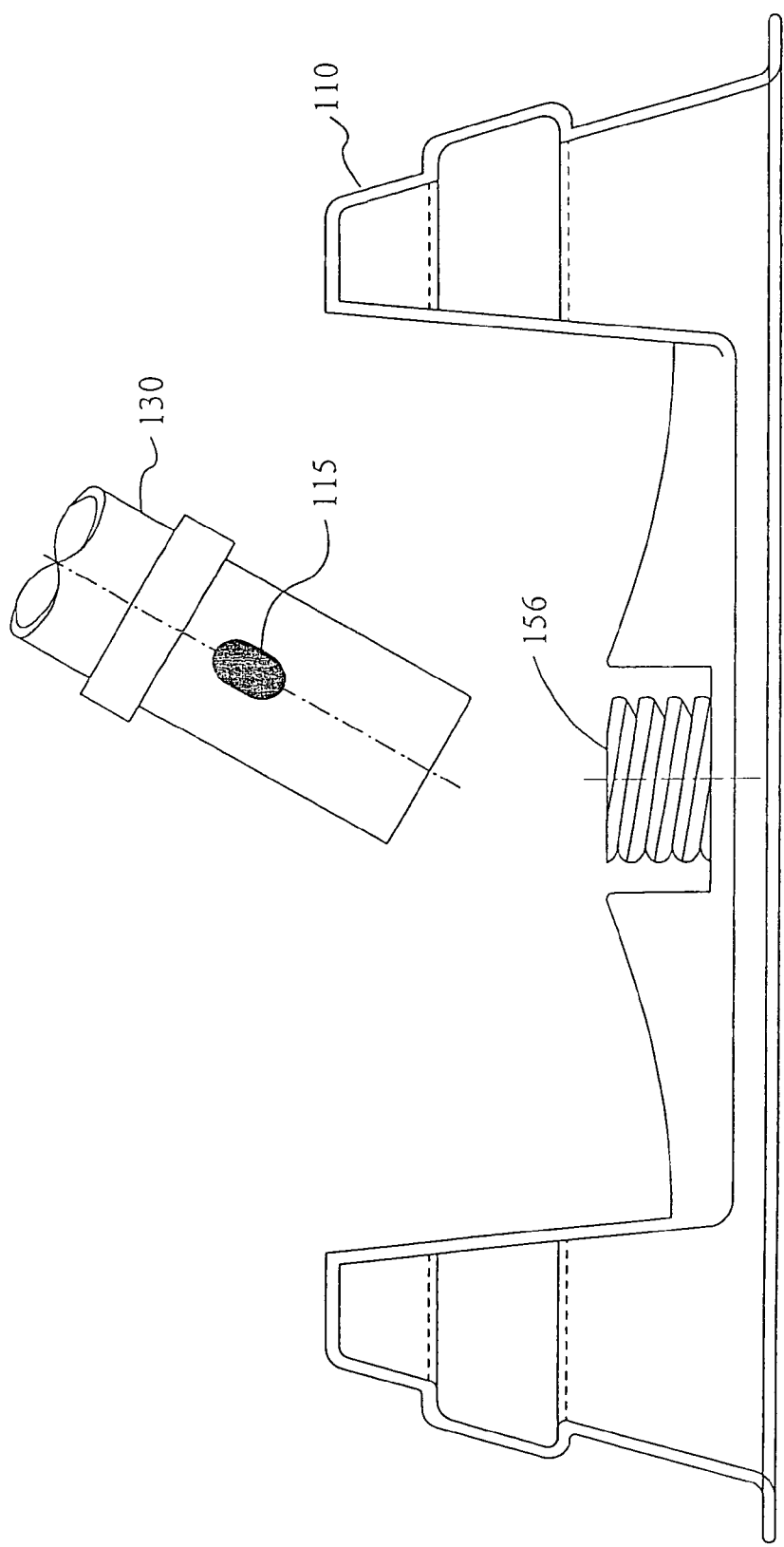
FIG. 1D provides a detailed side cut-away view showing a threaded coupling mechanism of one embodiment of the bowl filling apparatus of the present invention.

FIG. 1D is a side cut-away detailed view showing yet another embodiment of the bowl filling apparatus of the present invention. In this embodiment the body portion 130 couples with the bowl 110 through a threaded joining mechanism. A threaded cylinder 156 extends up from the bottom of the bowl 110. In FIG. 1D the threaded cylinder is inlayed into the bowl 110. The body portion 130 has a threading area (not shown) which accommodates the threaded cylinder 156 when the body portion 130 is screwed onto the threaded cylinder 156 and couples the body portion 130 to the bowl 110. When coupled, an aperture 115 on the body portion 130 remains open to allow the flow of fluid therethrough.

Figures 2A, 2B:
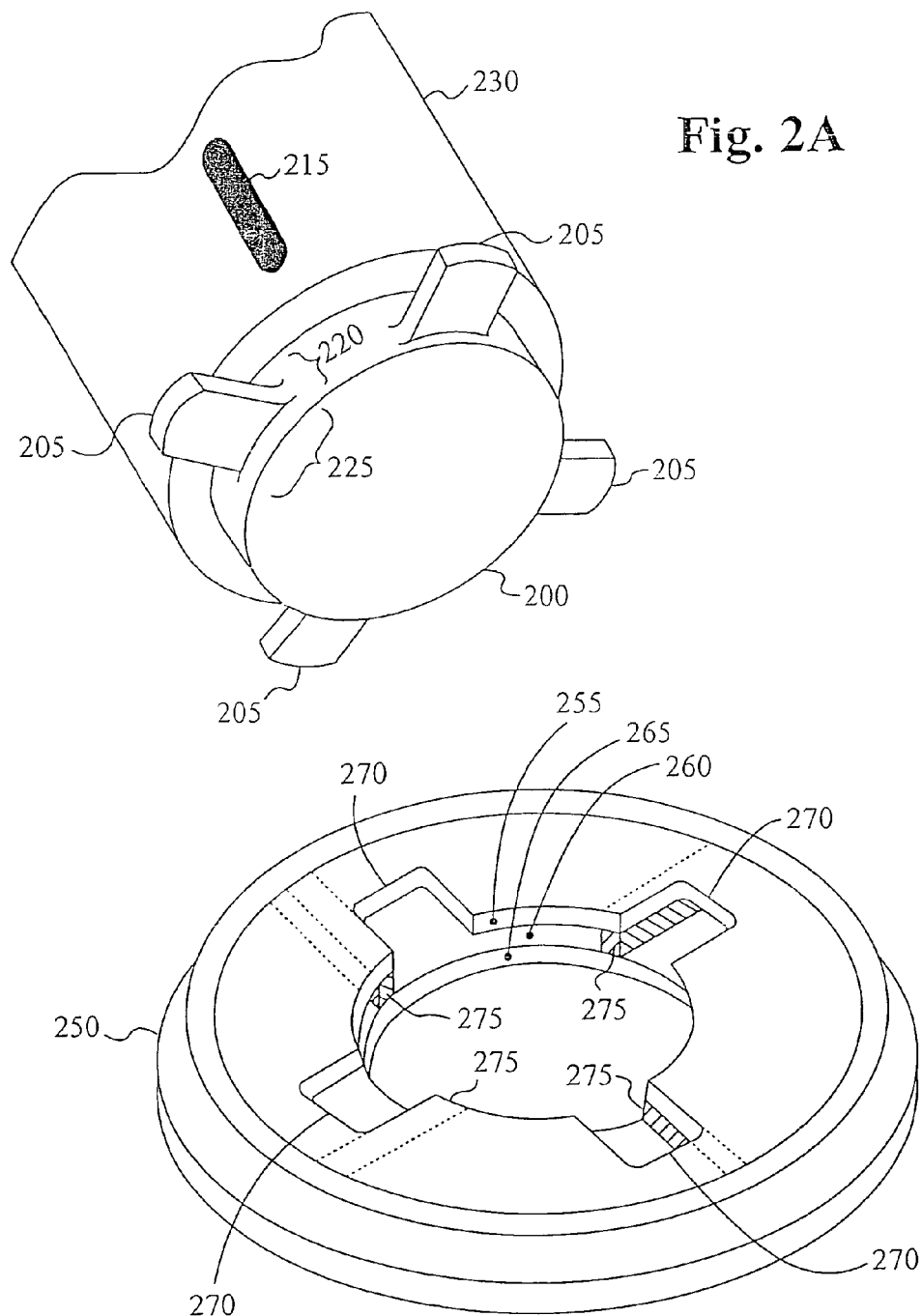
FIG. 2A is a perspective view of one example of a coupling plug according to some embodiments of the present invention.
FIG. 2B is a perspective view of one example of a coupling socket according to some embodiments of the present invention.

FIGS. 2A and 2B show, in a perspective view, one example of a coupling plug 200 and coupling socket 250 pairing according to some embodiments of the present invention. The coupling plug 200 is located at the bottom end of the body portion 230 (represented as 130 in FIG. 1) of the bowl filling apparatus of the present invention. In certain embodiments, the coupling plug 200 is non-hollow and does not accommodate fluid. However, in other embodiments, the coupling plug 200 does accommodate fluid. In FIG. 2A, the coupling plug is a cylindrical member centered on the bottom of a cylindrical body portion 230. The circumference of the coupling plug 200 is smaller than that of the body portion 230. Located on the coupling plug 200 are four coupling wings 205 spaced out axially equidistant to each other and all vertically centered about the same circumference. In the embodiment shown in FIG. 2A, the thickness 220 of the coupling wings 205 are equal and the coupling wings 205 have a width 225.

FIG. 2B shows one example of a coupling socket 250 of the present invention. In some embodiments of the present invention, the coupling socket 250 has two distinct layers: a top layer 255 and a bottom layer 265. Between the layers is a space 260. The space 260 is substantially equal to the thickness 220 of the coupling wings 205. The coupling socket 250 is also configured with four coupling wing channels 270. The coupling wing channels 270 are spaced out axially equidistant to each other and have a width substantially equal to the width 225 of the coupling wings 205. Also, within the space 260 are four wall stoppers 275.

In the embodiment shown in FIG. 2A, the coupling wings 205 and the coupling wing channels 270 have rounded corners (not shown) and graded edges (not shown) to facilitate smooth coupling and decrease the amount of accuracy needed to assemble the apparatus.

As shown in FIG. 2A and FIG. 2B, the coupling wings 205 on the coupling plug 200 fit into the space 260 via the coupling wing channels 270 of the coupling socket 250. Once the coupling wings 205 are inside the space 260, a user is able to rotate the body portion 230 clockwise until the coupling wings 205 interfere with the wall stoppers 275.

In some embodiments of the present invention, a washer (not shown) is positioned over the coupling socket 250. The washer is used to create a more hermetic seal between the coupling plug 230 and the coupling socket 250. Also, in some embodiments of the present invention, the coupling socket 250 is integrally formed with the bowl 110, and the top surface 255 is the same surface as the surface of the bowl 110.

FIG. 2A also shows a possible position of the aperture 215 (represented as 115 in FIG. 1). In this position, any fluid located below the aperture 215 within the body portion 230 or within the coupling plug 200, if hollow, will not pour out of the aperture 215 when the body portion 230 is coupled to the coupling socket 250 and the bowl 110.

In some embodiments of the present invention, an actuator (not shown) is located within the coupling plug 230 or within the coupling socket 250. The actuator (not shown) alternatively stops and starts the flow of fluid through the coupling plug 230 or the coupling socket 250.

FIGS. 2C and 2D show, in a perspective view, one example of a coupling plug 200 and coupling socket 250 pairing according to other embodiments of the present invention. In FIGS. 2C and 2D, the coupling plug 200 attached to the body portion 230 has only three coupling wings 205 and the coupling socket 250 has three corresponding coupling wing channels 270. In some embodiments of the present invention, the coupling socket 250 has two distinct layers: a top layer 255 and a bottom layer 265. Between the layers is a space 260. The space 260 is substantially equal to the thickness 220 of the coupling wings 205. The coupling socket 250 is also configured with three coupling wing channels 270. The coupling wing channels 270 are spaced out axially equidistant to each other and have a width substantially equal to the width 225 of the coupling wings 205. Also, within the space 260 are three wall stoppers 275.

FIG. 2E shows another embodiment of the present invention. In FIG. 2E, the body portion 230 has an aperture 215 and coupling socket 210. In some embodiments, the coupling socket 210 is clear plastic. The coupling socket 210 has three coupling wing channels 280. FIG. 2E also shows the bowl 285 with a coupling plug 290. The coupling plug 290 has three coupling wings 295 which correspond with the coupling wing channels 280 in FIG. 2E. In some embodiments of the present invention, the coupling socket 210 has two distinct layers: a top layer 211 and a bottom layer 212. Between the layers is a space 213. The space 213 is substantially equal to the thickness 214 of the coupling wings 295. The coupling socket 210 is also configured with three coupling wing channels 280. The coupling wing channels 280 are spaced out axially equidistant to each other and have a width substantially equal to the width 216 of the coupling wings 295. Also, within the space 213 are three wall stoppers 217.

Figure 3:
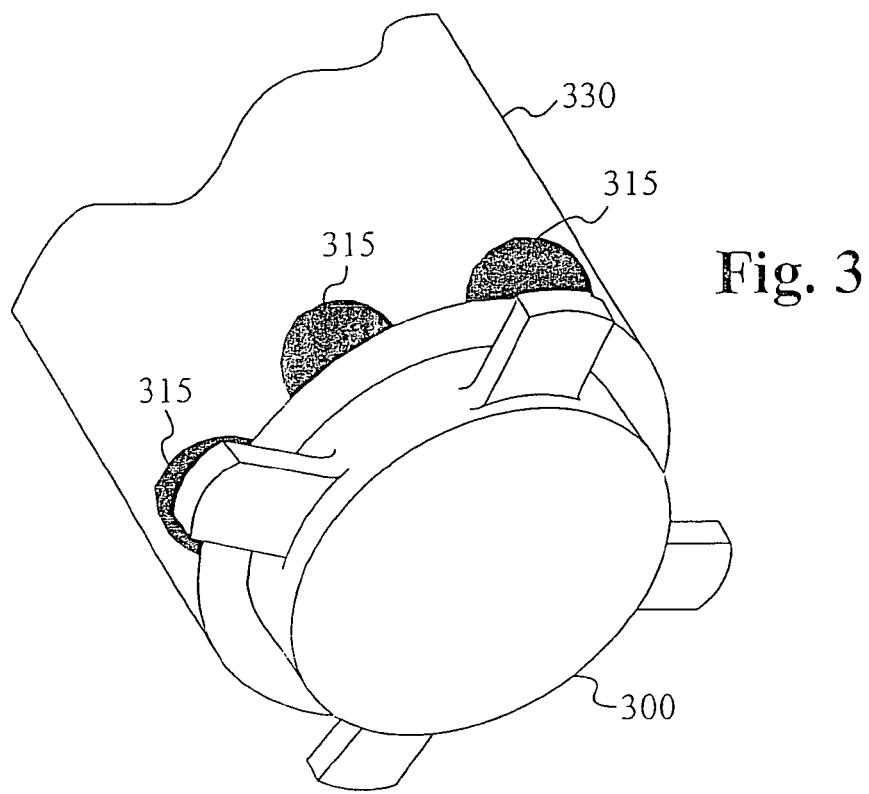
FIG. 3 is a perspective view of another example of a coupling plug according to some embodiments of the present invention.
Figure 4:
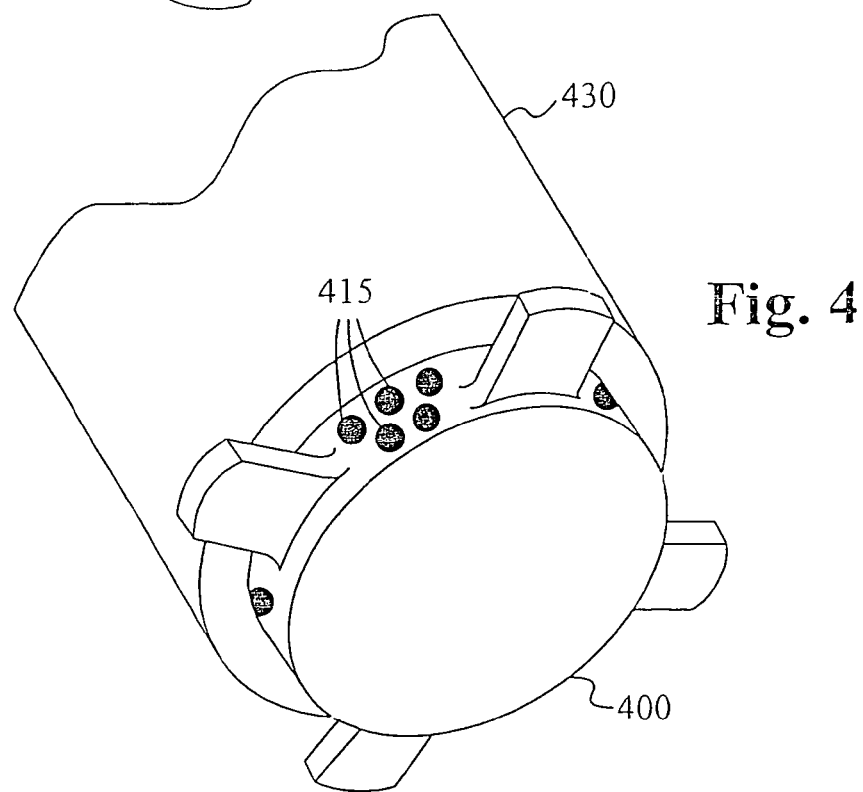
FIG. 4 is a perspective view of yet another example of a coupling plug according to some embodiments of the present invention.

FIG. 3 and FIG. 4 illustrate examples of other possible positions for the apertures 315, 415 in some embodiments of the present invention. In the embodiment illustrated in FIG. 3, the apertures 315 are spaced out along the bottom of the body portion 330. The hollow elevator portion of the body portion of the bowl filling apparatus according to FIG. 3 is able to be completely drained of fluid provided the coupling plug 300 is not hollow. In the embodiment illustrated in FIG. 4, the coupling plug 400 is hollow. The apertures 415 are spaced out in a pattern on the body of the coupling plug 400. The hollow elevator portion of the body portion of the bowl filling apparatus according to FIG. 4 is drained provided that the coupling socket (not shown) has its own draining apertures.

Figure 5A:
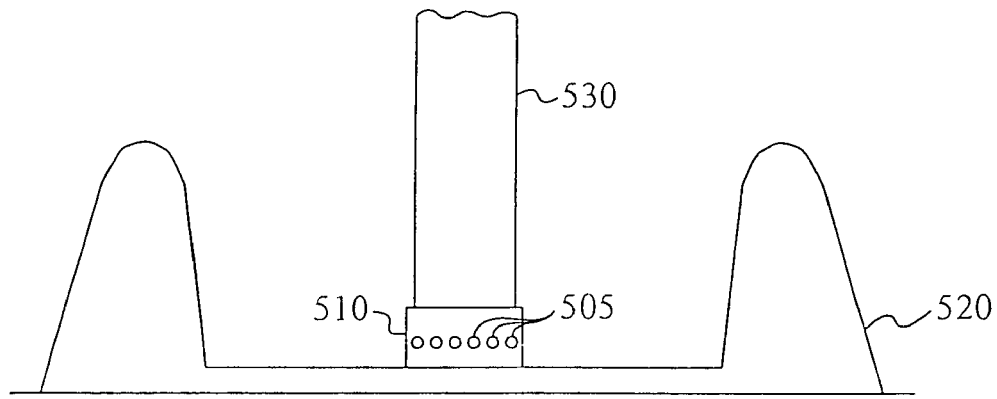
FIG. 5A is a cut-away view of one example of a coupling socket according to some embodiments of the present invention.
Figure 5B:
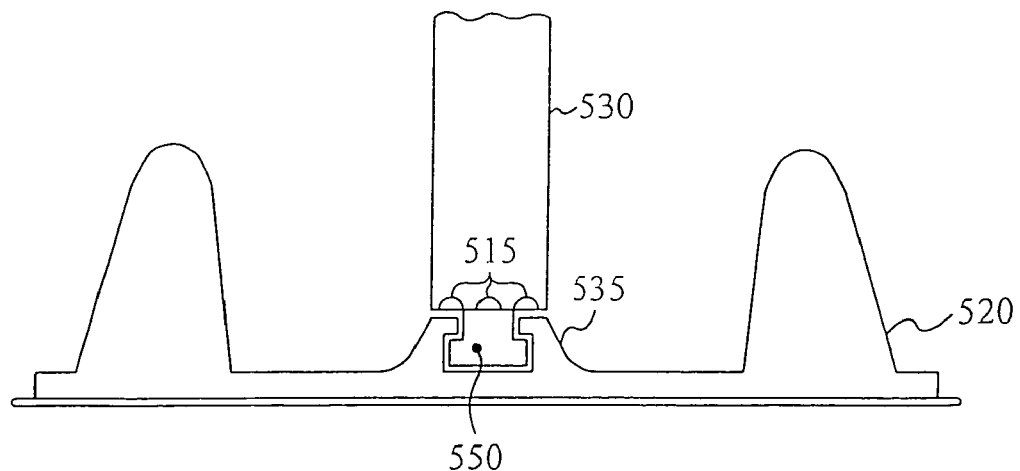
FIG. 5B is a cut-away view of one example of a coupling socket and coupling plug pairing according to some embodiments of the present invention.

FIG. 5A and FIG. 5B are cutaway views illustrating two more examples of the present invention. In FIG. 5A, the body portion 530 is coupled with the coupling socket 510 via the coupling plug (not shown). The coupling plug has apertures on it as illustrated in FIG. 4. The coupling socket 510 also has openings 505 in its structure. In this example, fluid poured into the body portion flows into the hollow coupling plug, through the apertures (not shown) in the coupling plug and finally through the openings 505 in the coupling socket's 510 structure and into the bowl 520.

In FIG. 5B, the body portion 530 is coupled to the coupling socket 535 via the coupling plug 550. As shown, the coupling socket 535 is integrally formed with the bowl 520. In this example, the apertures 515 are positioned along the bottom surface of the body portion 530.

Figure 5C:
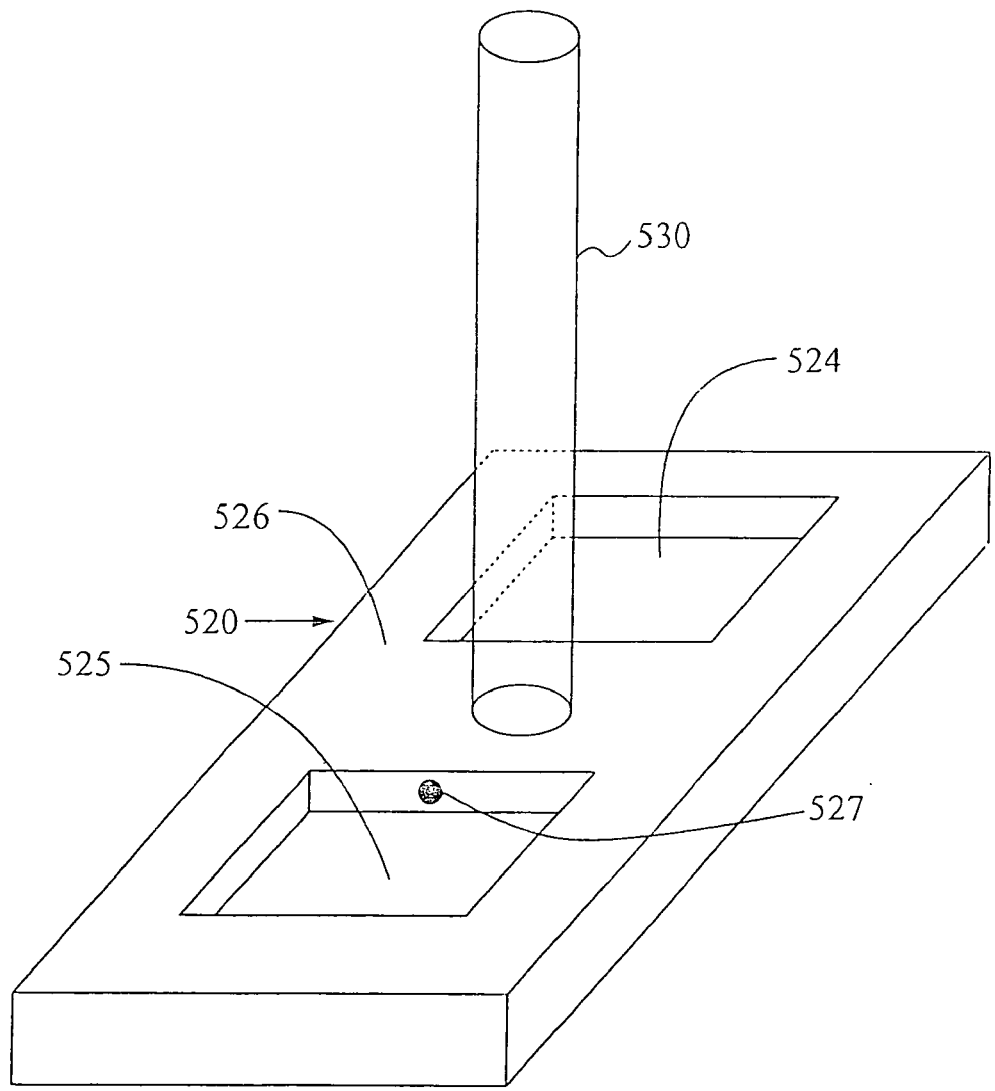
FIG. 5C provides a perspective view of one embodiment of the present invention with a dual-sided bowl.

FIG. 5C illustrates another embodiment of the present invention in which the bowl 520 has two compartments 524, 525 for fluid or food. The bowl 520 is integrally formed and has a middle section 526 to separate the two compartments 524,525. The middle section 526 has a space (not shown) to accommodate the body portion 530 and has one end of a coupling mechanism (not shown) and the body portion 530 has the corresponding end of a coupling mechanism (not shown). The bowl 520 has an aperture 527 which connects compartment 525 with the space to accommodate the body portion 530. The body portion 530 also has an aperture (not shown) to allow fluid flow from the body portion 530, through the aperture 527 and into the compartment 525. In some embodiments, another aperture (not shown) is located in the compartment 524 and fluid can flow into compartment 524 as well.

The above examples of configurations for the coupling plug, the coupling socket, and the apertures each achieve different design and use goals. Although specific configurations are given, other configurations are contemplated as would be realized by those skilled in the art.

Figure 6:
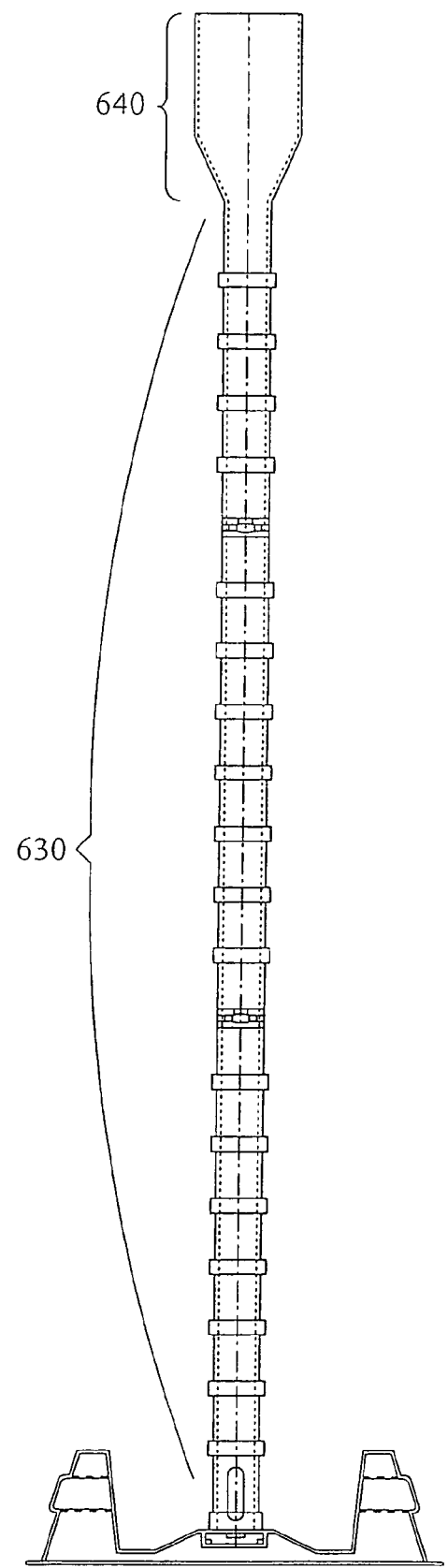
FIG. 6 provides a side cut-away view showing one embodiment of the bowl filling apparatus of the present invention with a flared top end.
Figure 7:
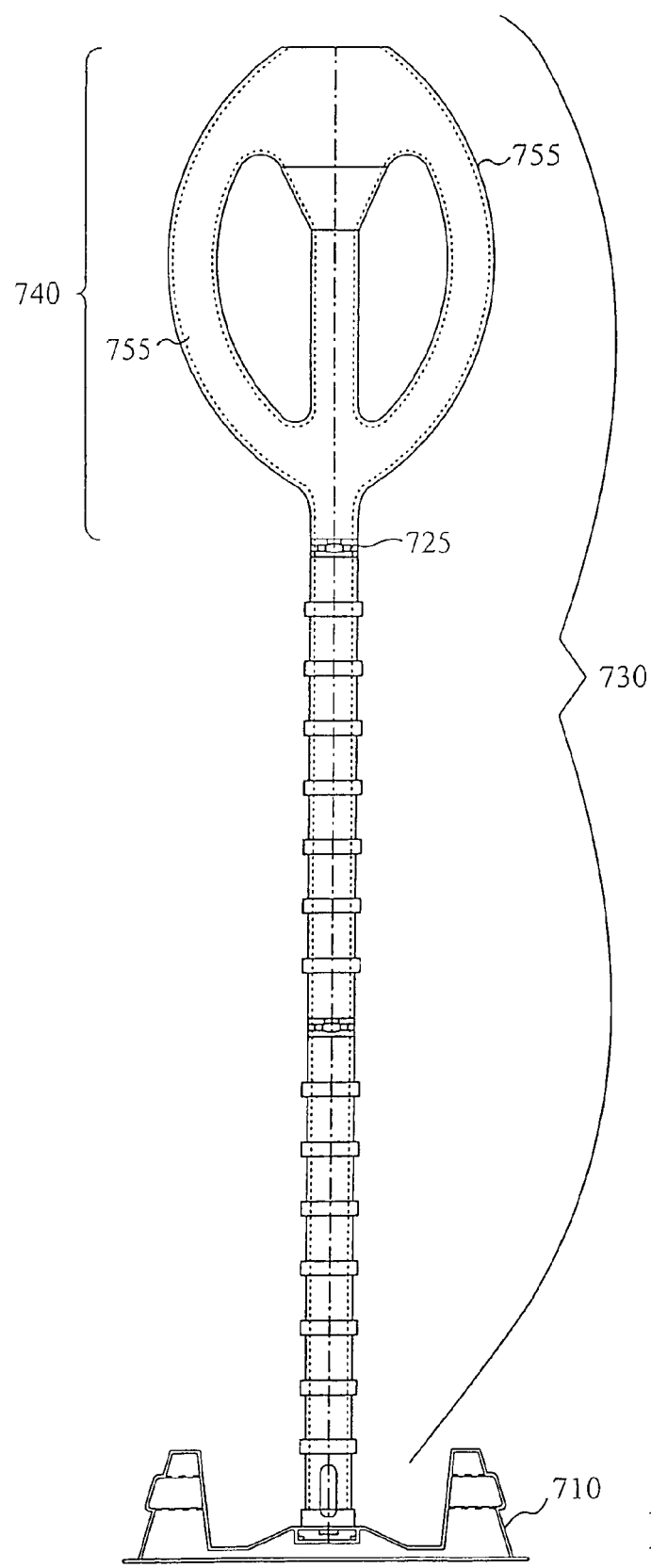
FIG. 7 provides a side cut-away view showing one embodiment of the bowl filling apparatus of the present invention with an integrally formed handle.
Figure 8:
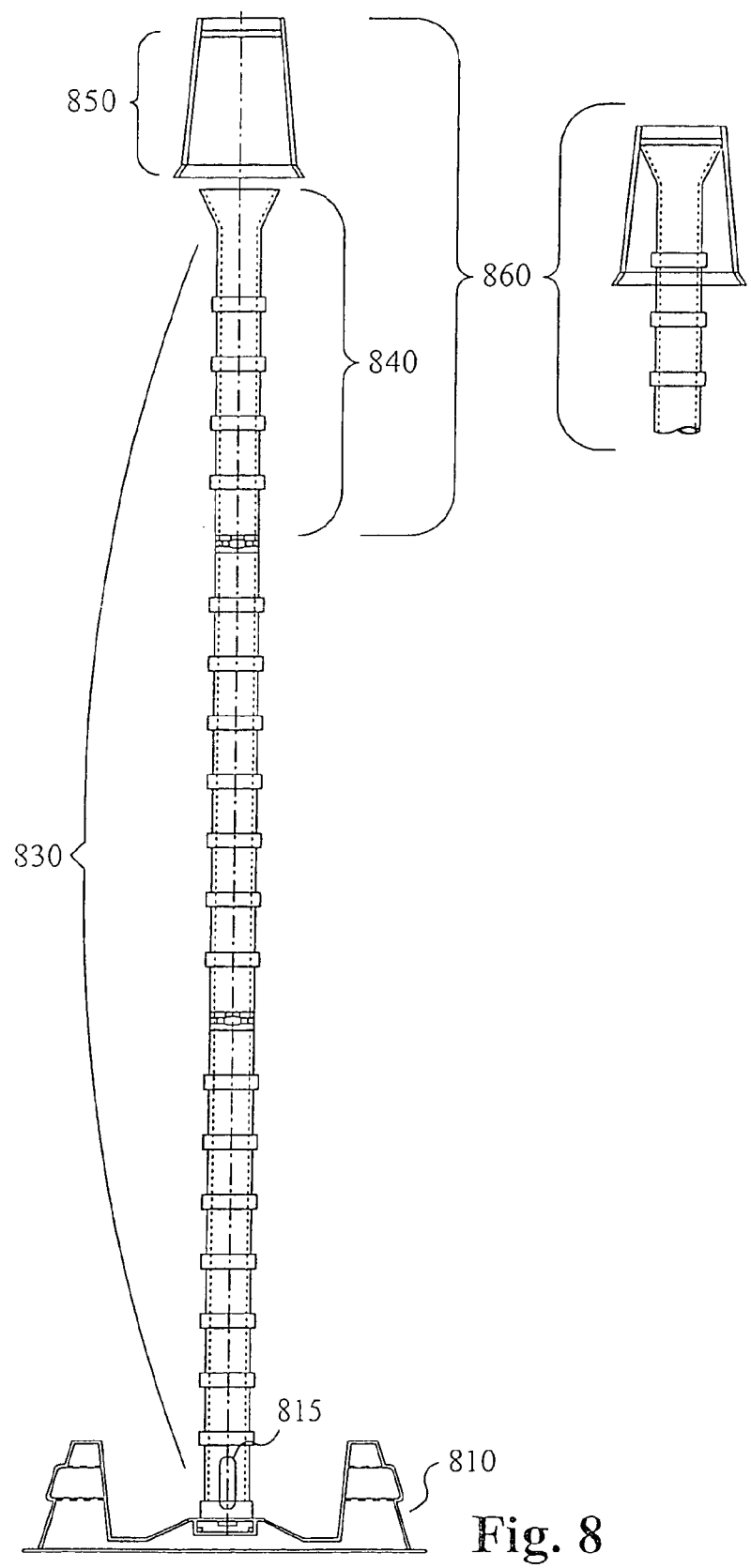
FIG. 8 provides a side cut-away view showing one embodiment of the bowl filling apparatus of the present invention with a filling cup.

In FIGS. 6-8, three embodiments of the present invention are disclosed. In these and other embodiments, the top end of the body portion is uniquely configured to achieve design and use goals. Although specific configurations are given, other configurations are contemplated as would be realized by those skilled in the art.

In FIG. 6, the bowl filling and lifting apparatus of the present invention has a body portion 630 with a top end 640. The top end 640 is wider in circumference than the body portion. This configuration allows a user to empty a larger amount of water into the body portion 630 through the top end 640 in a shorter time and with less accurate pouring. The top end 640, as illustrated in FIG. 6, is especially suitable for a user with poor eyesight or without a steady hand.

In FIG. 7, the bowl filling and lifting apparatus of the present invention has a body portion 730 with a top end 740. The top end 740 is removably coupled from the rest of the body portion 730 via a joint mechanism 725. In some embodiments, the bottom of the top end 740 has a sealing mechanism (not shown) which seals the bottom of the top end 740 when it is removed from the body portion 730 and also unseals when the top end 740 is re-attached. The top end 740 has one or more handles 755. In some embodiments of the present invention, the handles 755 are hollow. The top end 740, as illustrated in FIG. 7, is especially suitable for a user who positions the bowl a long distance away from a fluid source. That user is able to remove the top end 740, carry it to a fluid source, fill the detached top end 740, carry it back to the bowl filling and lifting apparatus and then reattach the top end 740 to the body portion 730 to allow fluid to flow into the body portion. Alternatively, the user is able to lift the bowl 710 by using the handle 755 and move the entire filling and lifting apparatus to the fluid source.

In FIG. 8, the bowl filling and lifting apparatus of the present invention has a body portion 830 with a top end 840 and an aperture 815. The embodiment shown also has a detachable cup 850. In some embodiments of the present invention, the detachable cup 850 has a capacity substantially equal to the capacity of the bowl 810. This embodiment may be especially suited for a user who fills the bowl 810 only after it has been emptied of fluid.

In some embodiments of the present invention, the cup 850 is coupled to the top end 840 via a sealing mechanism wherein a barometric seal is created when attached, as shown at 860. A barometric seal (not shown) seals the inside of the tube 830 from atmospheric pressure. Without such a seal excess fluid in the body portion 830 would spill out of the aperture 815 over the bowl 810 and onto the floor.

Figure 9:
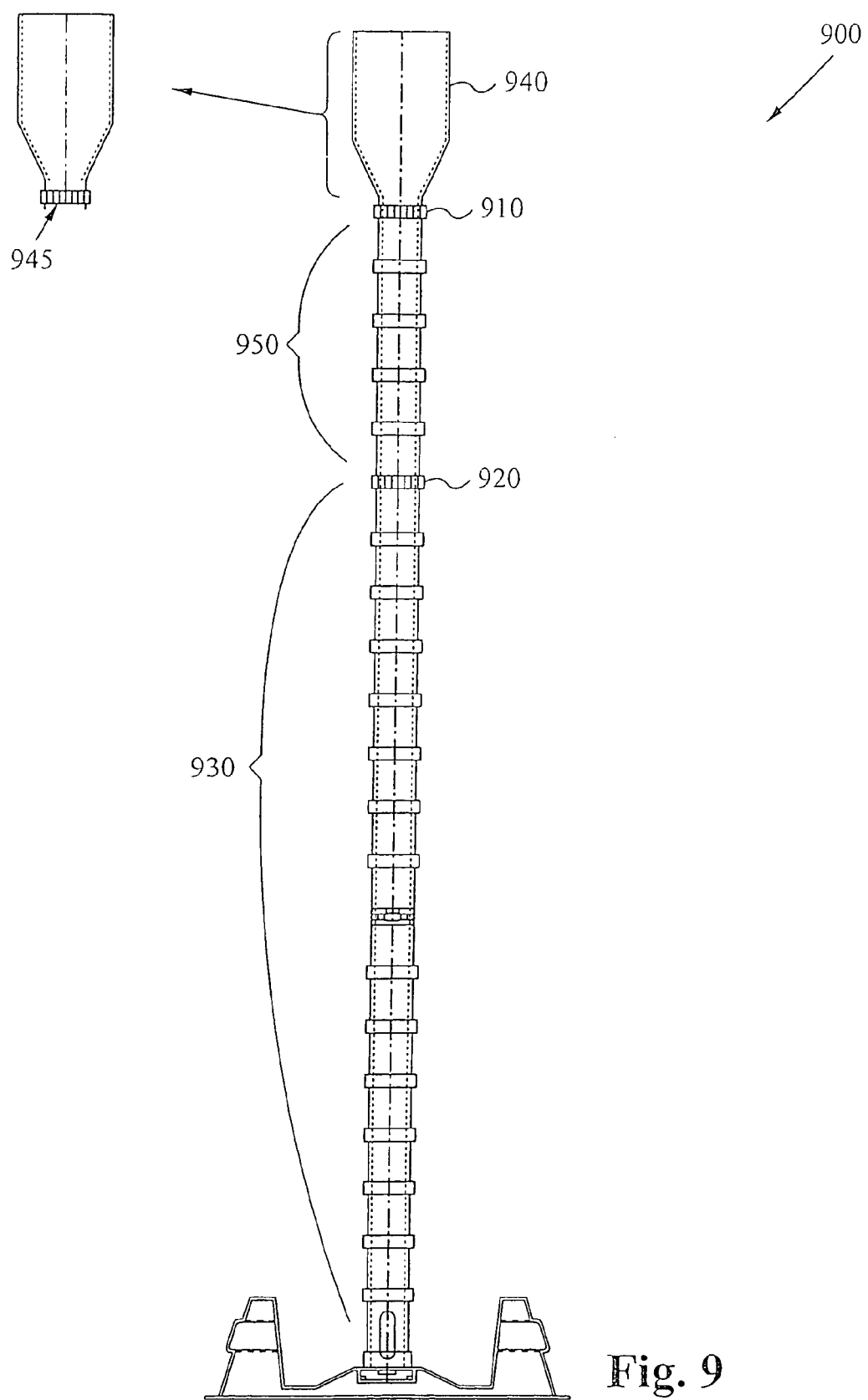
FIG. 9 provides a side cut-away view showing one embodiment of the bowl filling apparatus of the present invention with an intermediate fluid transferring section.

In some embodiments of the present invention, the bowl filling and lifting apparatus also functions as a bulk fluid storage apparatus. One particular embodiment 900 shown in FIG. 9 is used for providing water to a pet without having to bend down and for storing extra water within the body portion 930 whereas the extra water flows into the bowl as the water in the bowl is drank by the pet. To achieve such a system, the body portion 930 of the bulk fluid storage device must be barometrically sealed at all times. In some embodiments this sealing is achieved by using a filling cup 940 and an intermediate transferring section 950 and two sealing joints 910 and 920. In some embodiments, the intermediate transferring section 950 has a volume substantially equal to the volume of the detachable filling cup 940. Also in this embodiment, the bottom of the filling cup 940 is configured with a sealing mechanism 945 to alternately seal and open. In some embodiments the sealing mechanism seals the bottom of the detachable filling cup 940 when the detachable sealing cup 940 is detached and opens to allow fluid flow when the detachable sealing cup 940 is attached.

Figure 10A:
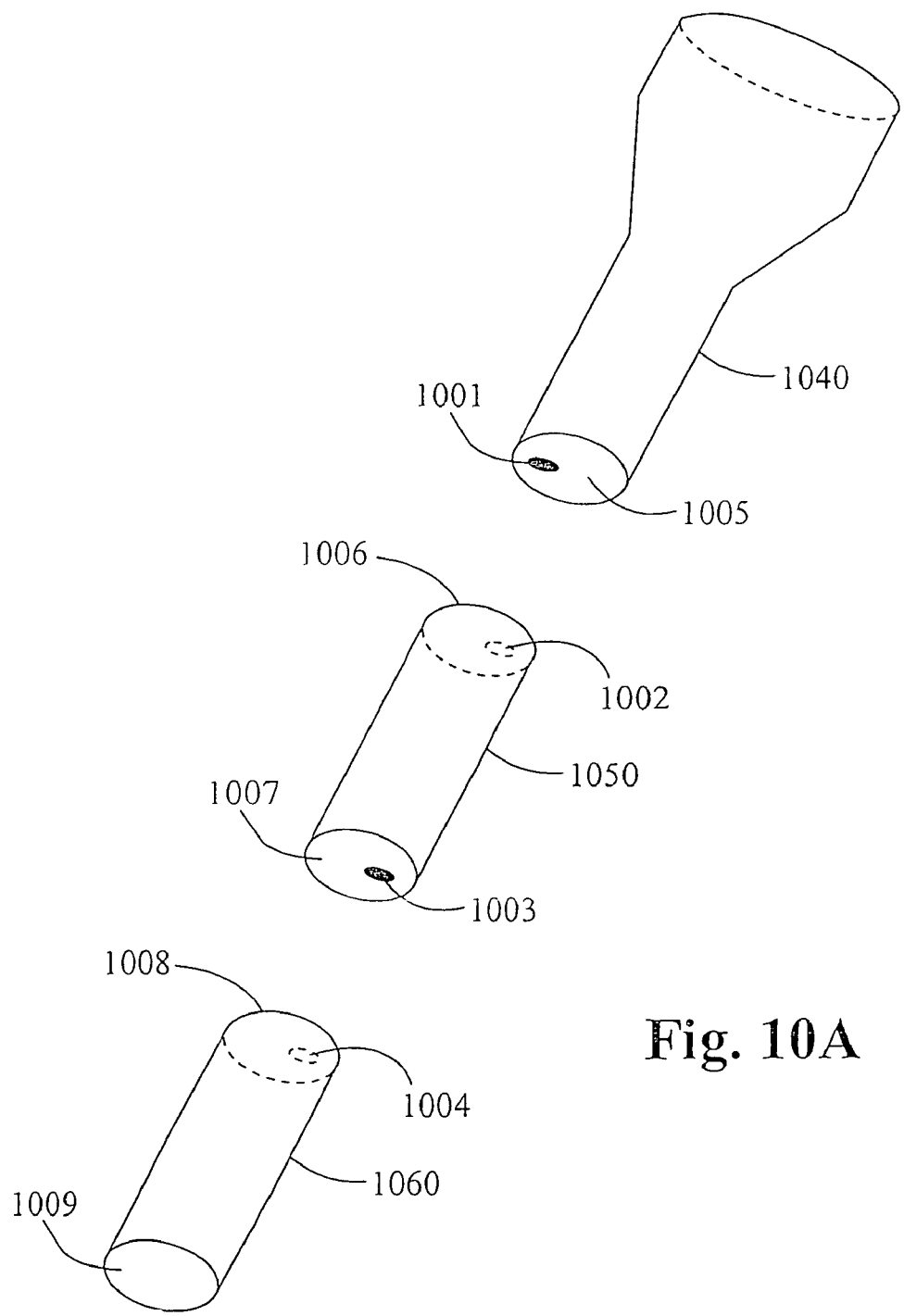
FIG. 10A provides a prospective of the top end of the present invention in three segments.
Figure 10B:
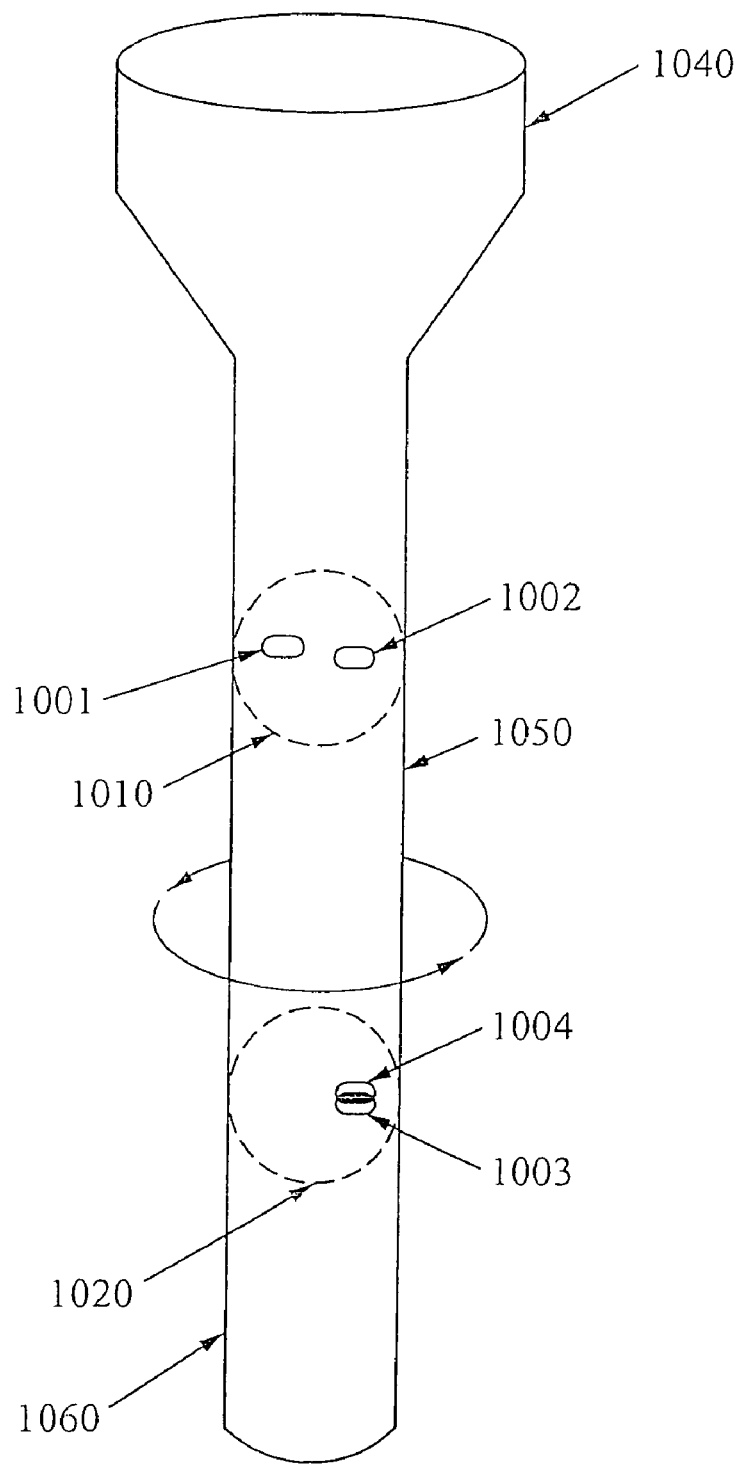
FIG. 10B illustrates one example of the intermediate fluid transferring section when fluid is poured into the top end.
Figure 10C:
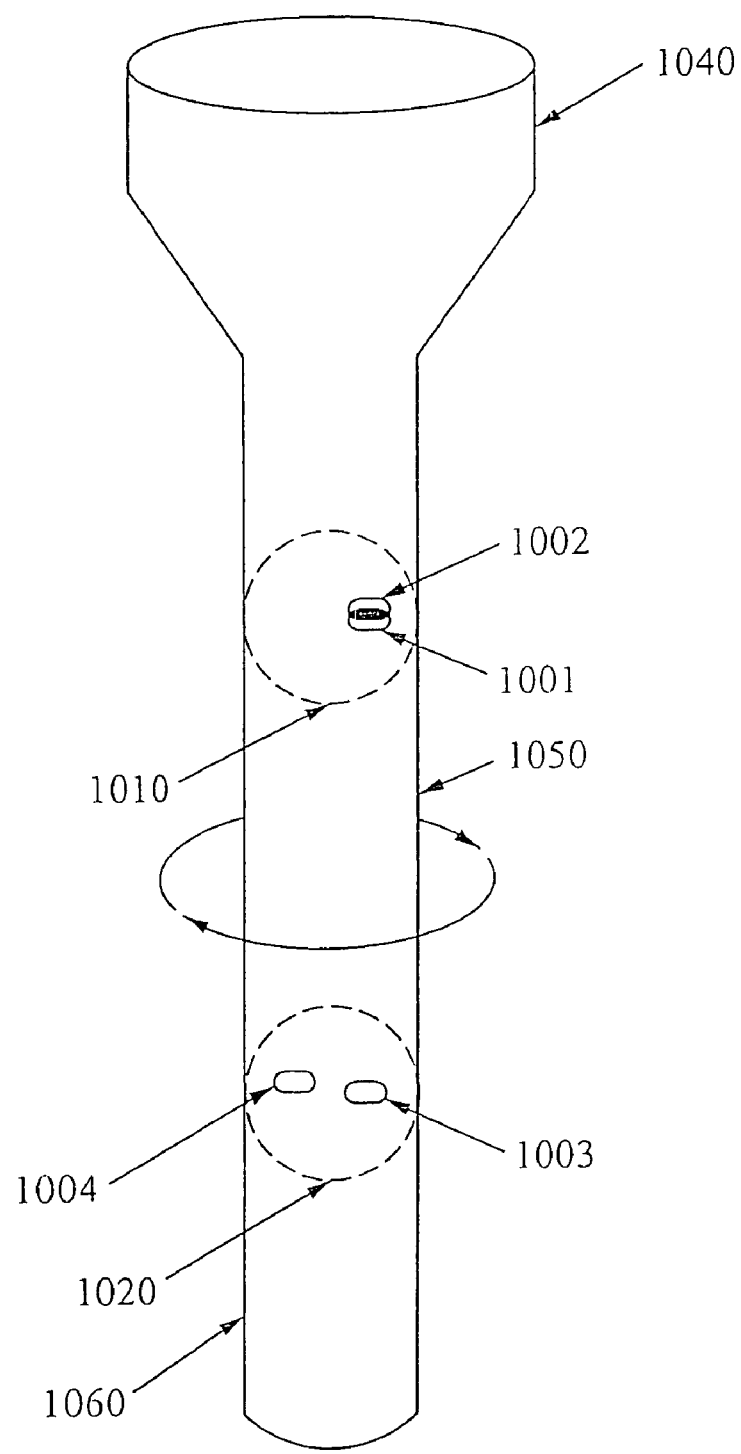
FIG. 10C illustrates one example of the intermediate fluid transferring section when fluid is transferred into the intermediate section.
Figure 10D:
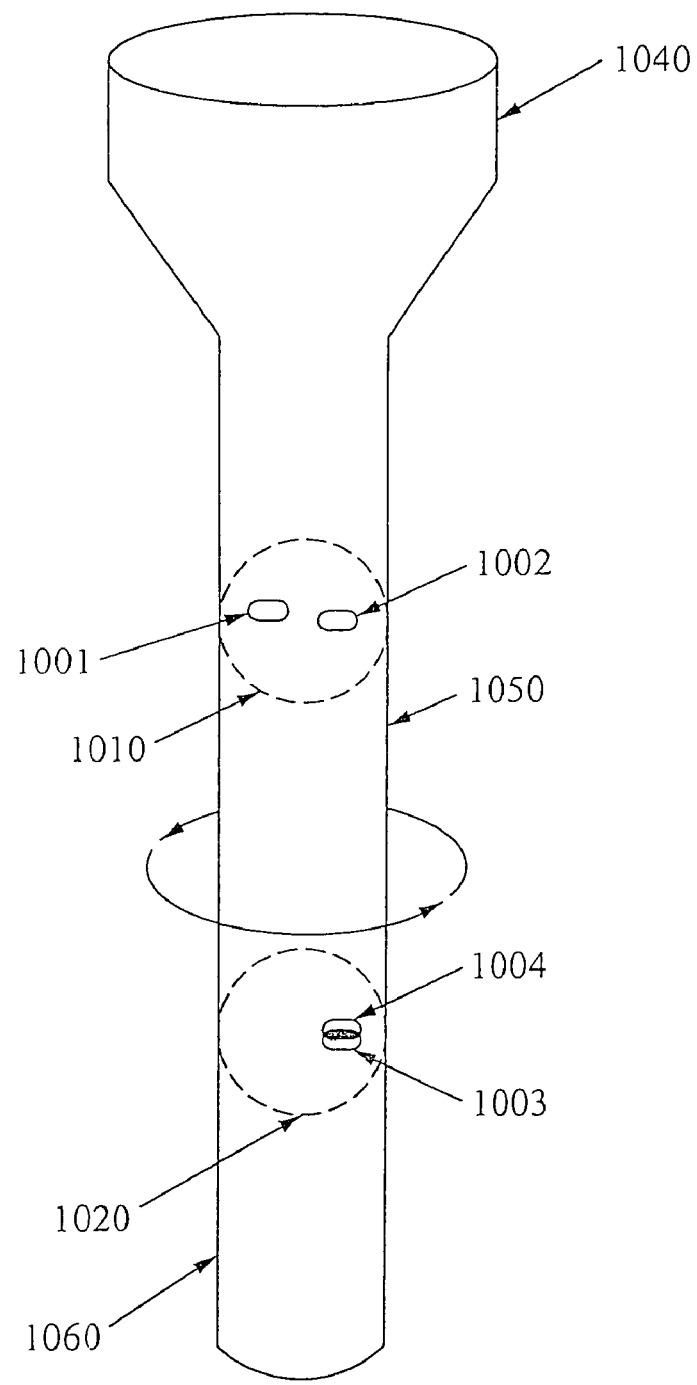
FIG. 10D illustrates one example of the intermediate fluid transferring section when fluid is transferred from the intermediate section into the body portion.

According to some embodiments of the present invention the bulk fluid storage apparatus functions as shown in FIGS. 10A-10D. In these Figures, a top joint 1010 and bottom joint 1020 are configured to alternately barometrically seal and allow fluid flow. FIG. 10A illustrates the top portion of the present invention separated into three attachable sections 1040, 1050 and 1060. As shown, a first section 1040 has a substantially closed bottom end 1005 with one conduit space 1001. A second section 1050 has a substantially closed top end 1006 with one conduit space 1002 and a substantially closed bottom end 1007 with one conduit space 1003. A third section 1060 has a substantially closed top end 1008 with one conduit space 1004 and a bottom end 1009 which couples with the rest of the body section (not shown). FIGS. 10B-10D show the segments illustrated in FIG. 10A attached.

FIG. 10B illustrates a filling position. When in a filling position, the apertures 1001 and 1002 are not lined up and the conduit spaces 1003 and 1004 are at least partially lined up. Also in this configuration, a barometric seal exists at the top joint 1010. The second section 1050 is rotatable, in this case counter-clockwise to allow the apertures 1002 and 1003 to change position.

FIG. 10C shows the intermediate fluid transferring position. When the section second 1050 is rotated by a certain degree of rotation, the conduit space 1002 is lined up below the conduit space 1001. At approximately one half the degree of rotation, the conduit spaces 1003 and 1004 no longer line up. At this point there is a barometric seal at the joint 1020. At the full rotation, the conduit spaces 1001 and 1002 are at least partially lined up, and allow fluid flow from the first section 1040 therethrough into the second section 1050. After fluid flows from the section first 1040 to the section second 1050 through the conduit spaces 1001 and 1002, a user rotates the second section 1050 back to its original position, in this case clockwise. At approximately half the degree of that rotation, the conduit spaces 1001 and 1002 completely de-align and a barometric seal is created at the joint 1010. When the rotation is complete, the conduit spaces 1003 and 1004 are again at least partially lined up and fluid is able to flow from the second section 1050 into the third section 1060 and the body portion (not shown). FIG. 10D shows the apparatus after fluid has been transferred and stored. Since a barometric seal is always present in the system, fluid in the section third 1060 is not affected by atmospheric pressure and fluid will not spill out of the apparatus even if there is more fluid in the apparatus than the capacity of the bowl (not shown).

In another aspect of the present invention, attachments are provided to serve ancillary functions which arise to solve problems associated with food or liquid delivery without bending. Examples of such problems include picking up pet hair, absorbing spilled fluid and picking up spilled food.

Figure 11:
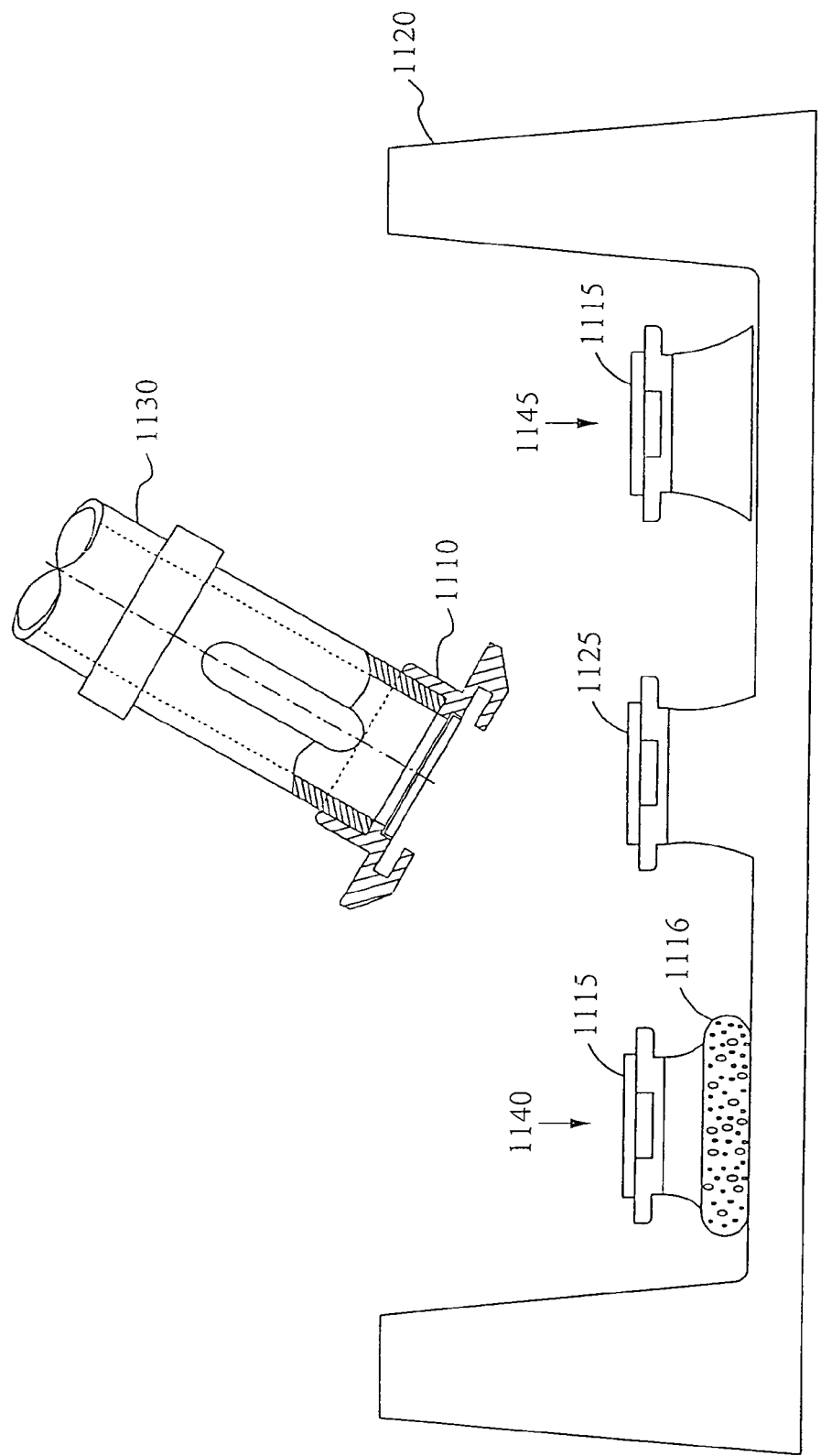
FIG. 11 is a side view of the attachment storage device with attachments according to some embodiments of the present invention.

In some embodiments of the present invention, as shown in FIG. 11, attachments to solve these problems couple to the body portion 1130. As shown, the bottom of the body portion includes a coupling socket 1110. The coupling socket 1110 couples with a bowl (not shown) as depicted in FIG. 2E. When not coupled with a bowl (not shown) the coupling socket can couple with the coupling plugs 1115 of the attachments 1140, 1145 or with other attachments not shown. The attachments 1140, 1145 are stored in a storage device 1120. The storage device 1120 has an integrally formed coupling plug 1125. The coupling socket 1110 couples with the coupling plug 1125 to allow a user to lift, move and access the storage device 1120 without bending.

Attachment 1140 includes a sponge 1116 to soak up liquid. A user couples the sponge attachment 1140 with the body portion 1130 to act as an arm to soak up spilled liquid that may be spilled from the bowl (not shown). Attachment 1145 is a cleaning tool to pick up lint. In one embodiment of the invention, the attachment 1145 has a bottom surface (not shown) with the hook side of a hook and loop fastener system such as Velcro. In this embodiment, a user attaches a lint-attracting pad (not shown) having an upper surface with the loop side of a hook and loop fastener system and a bottom surface with lint-attractive adhesive. A user couples the attachment 1145 to the body portion 1130 and uses it as an arm to pick up a pet's shed hair or spilled food without bending. Other useful attachments associated with pet care and cleanup and designs to conveniently attach and store such attachments are contemplated and will be apparent to one normally skilled in the art.

Figure 12:
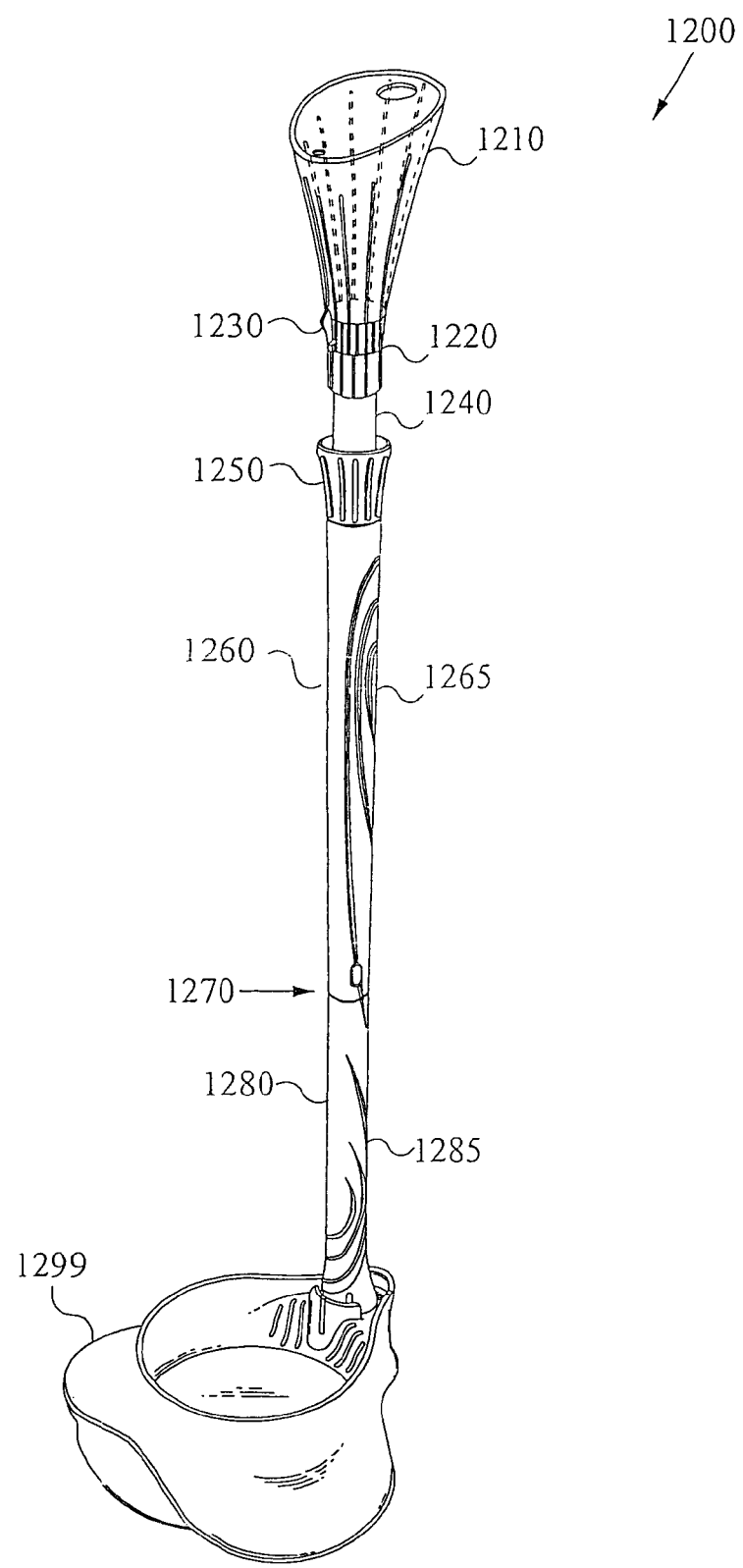
FIG. 12 illustrates a perspective view of the bowl lifting and filling apparatus according to some embodiments of the present invention.

FIG. 12 illustrates another embodiment of the present invention. The bowl lifting and filling apparatus 1200 in FIG. 12 includes a container 1210, a container coupling 1220, a valve interface 1230, a telescoping tube 1240, a top chute section 1260, a telescoping tube lock 1250, a bottom chute section 1280, a snap connection 1270, and a bowl 1299. The top chute section 1260 features ridges 1265 to allow an easy grip of the top chute section 1260 and the bottom chute section 1280 features ridges 1285 to allow easy grip of the bottom chute section 1280.

According to this embodiment, the bottom chute section 1280 couples to the bowl 1299, the snap connection 1270 couples the bottom chute section 1280 to the top chute section 1260, and the container coupling 1220 couples the telescoping tube 1240 with the container 1210. When the bowl lifting and filling apparatus 1200 is fully coupled, fluid is able to be poured into the container 1210. The valve interface 1230 alternatively holds fluid within the container 1210 and allows the fluid to flow through to the telescoping tube 1240. The container coupling 1220 allows the container 1210, the valve interface 1230 and the valve (not shown) to be removed from the telescoping tube 1240. The top chute section 1260 further comprises a telescoping tube lock 1250 which locks the telescoping tube 1240. The bottom chute section 1280 is configured to allow fluid to flow from the bottom chute section 1280 to the bowl 1299. As fluid is allowed through the valve (not shown), the fluid flows through the telescoping tube 1240, through the top chute section 1260, through the snap connection 1270, through the bottom chute section 1280 and into the bowl 1299.

Figure 13A:
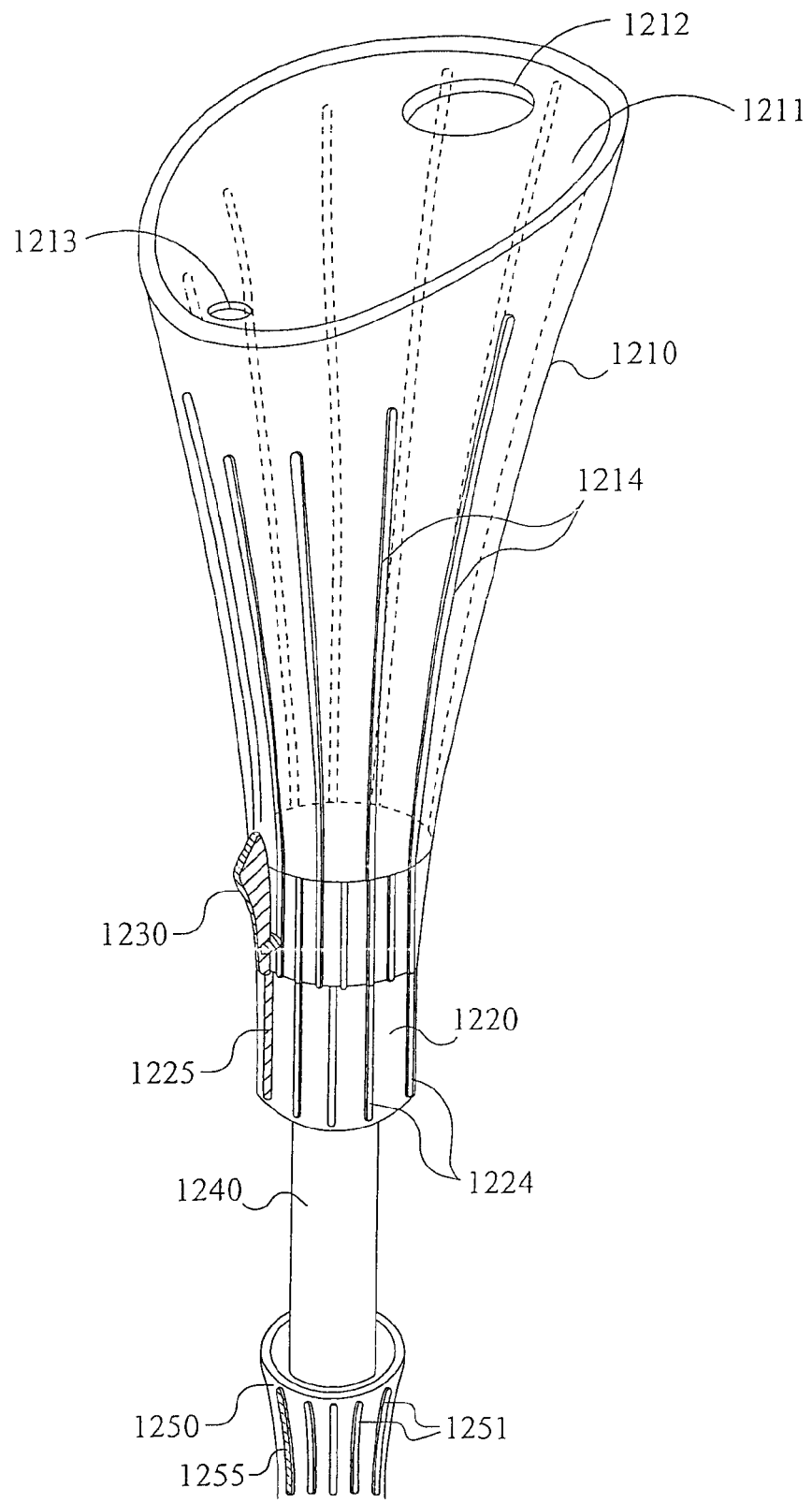
FIG. 13A illustrates a perspective view of the top section of the bowl lifting and filling apparatus according to some embodiments of the present invention.

FIG. 13A illustrates a close-up perspective view of the top sections of the bowl lifting and filling apparatus including the container 1210, the container coupling 1220, the valve interface 1230, the telescoping tube 1240 and the telescoping tube lock 1250. In some embodiments of the present invention, the container 1210 has a lid 1211. In some embodiments of the present invention the lid 1211 is removable. In some embodiments of the present invention, the lid 1211 contains a hole 1212. In other embodiments of the present invention, the lid 1211 contains the hole 1212 as well as an optional hole 1213. The holes 1212, 1213 allow a user to pour fluid into the container 1210 and also provides ventilation to the container to aide fluid flow through the valve (not shown). The container 1210, the container coupling 1220 and the telescoping lock 1250 also have a number of ridges 1214, 1224 and 1251, respectively, on their surface for easy gripping. Additionally, the container coupling 1220 and the telescoping lock 1250 have uniquely indicated ridges 1225, 1255. The uniquely indicated ridges 1225, 1255 line up when the telescoping lock 1250 is in the proper position to lock the telescoping tube 1240 in place (discussed below).

Figure 13B:
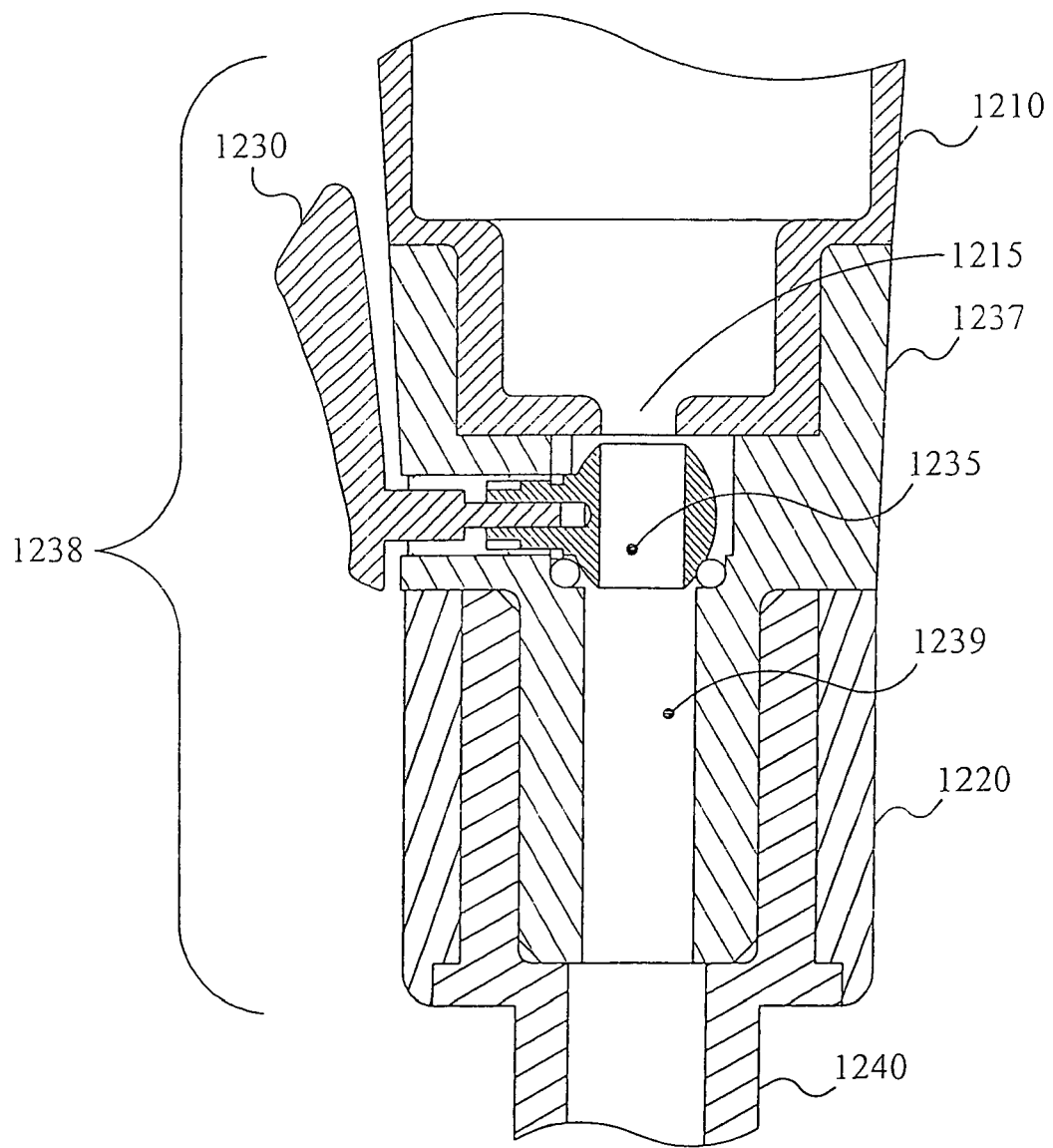
FIG. 13B illustrates a side view detail of the top section of the bowl lifting and filling apparatus according to some embodiments of the present invention.

FIG. 13B illustrates a side view of the valve sections of the bowl lifting and filling apparatus 1200 including the container 1210 with an opening 1215, the valve 1235, the valve interface 1230, the conduit 1239, the valve frame 1238 (indicated with a hatch pattern), the container coupling 1220 and the telescoping tube 1240. The container 1210, the valve 1235, the valve frame 1238 and the valve interface 1230 comprise a removable top section 1237. The removable top section 1237 alternatively couples and de-couples with the container coupling 1220. In some embodiments of the present invention, the container coupling 1220 comprises a form fitting cradle that merely supports the removable top section 1237. In other embodiments, the container coupling 1220 includes additional features to secure the removable top section 1237, including but not limited to screw threads, snap features, and tongue and groove features. When the removable top section 1237 is coupled to the container coupling 1220, and the valve 1235 is open, fluid flows from the container 1210, through the opening 1215, through the open valve 1235, through the conduit 1239 and into the telescoping tube 1240. Closing the valve 1235 allows a user the ability to fill the container 1210 at a remote location without having to move and carry the entire bowl lifting and filling apparatus 1200. Further, the valve 1235 allows a user to store fluid within the container 1210 for later use.

Figure 14A:
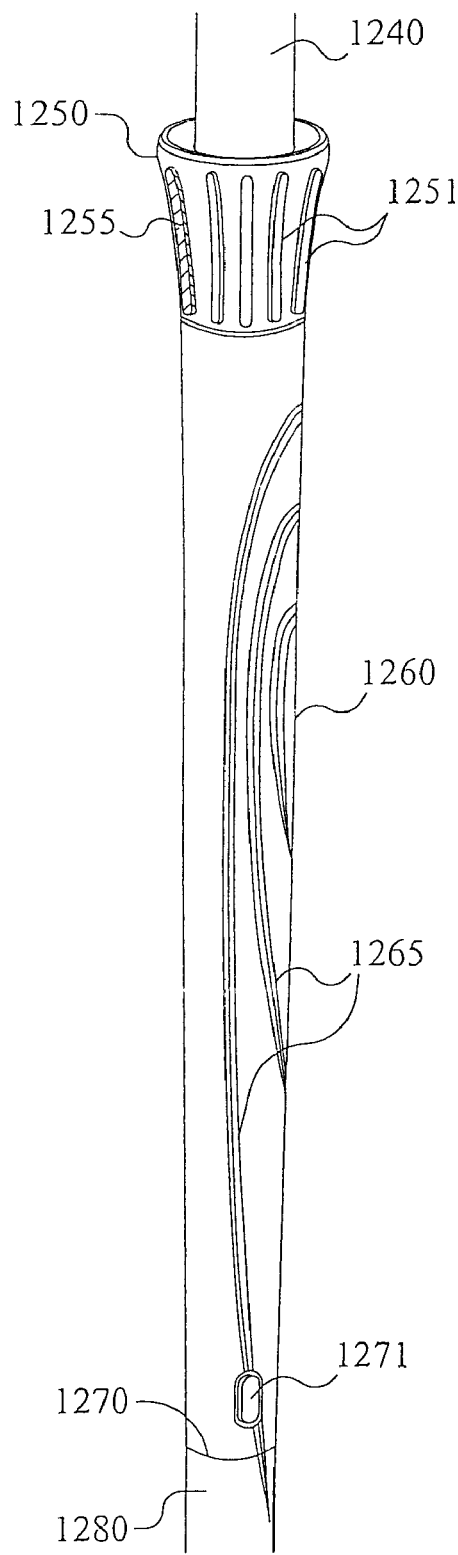
FIG. 14A illustrates a perspective view of the middle section of the bowl lifting and filling apparatus according to some embodiments of the present invention.

FIG. 14A illustrates a perspective view of the middle section of the bowl lifting and filling apparatus featuring the telescoping tube 1240, the telescoping lock 1250 with ridges 1251 and unique ridge 1255, a top chute section 1260, the ridges 1265, the snap connection 1270, the button 1271 and the bottom chute section 1280.

The telescoping tube 1240 is housed within the top chute section 1260. In some embodiments of the present invention, the telescoping lock 1250 rotates to alternatively engage and disengage the telescoping tube 1240. According to this embodiment, when the telescoping lock 1250 is engaged, the telescoping tube may not be moved vertically and when disengaged, the telescoping tube 1240 freely moves up and down. As such, a user is able to unlock the telescoping lock 1250, adjust the height of the telescoping tube 1240 and lock the telescoping lock 1250 again. In some embodiments of the present invention, the telescoping lock rotates in order to alternatively engage and disengage. According to this embodiment, a second unique ridge (not shown) is provided and the second unique ridge and the unique ridge 1255 line up when the telescoping lock 1250 is in the proper position to lock the telescoping tube 1240 in place.

The top chute section 1260 features ridges 1265 to allow an easy grip of the top chute section 1260. The top chute section 1260 couples to the bottom chute section 1280 via the snap connection 1270. The bowl lifting and filling apparatus 1200 is collapsible by de-coupling the top chute section 1260 from the bottom chute section 1280. As such, the bowl lifting and filling apparatus 1200 is easily transportable.

Figure 14B:
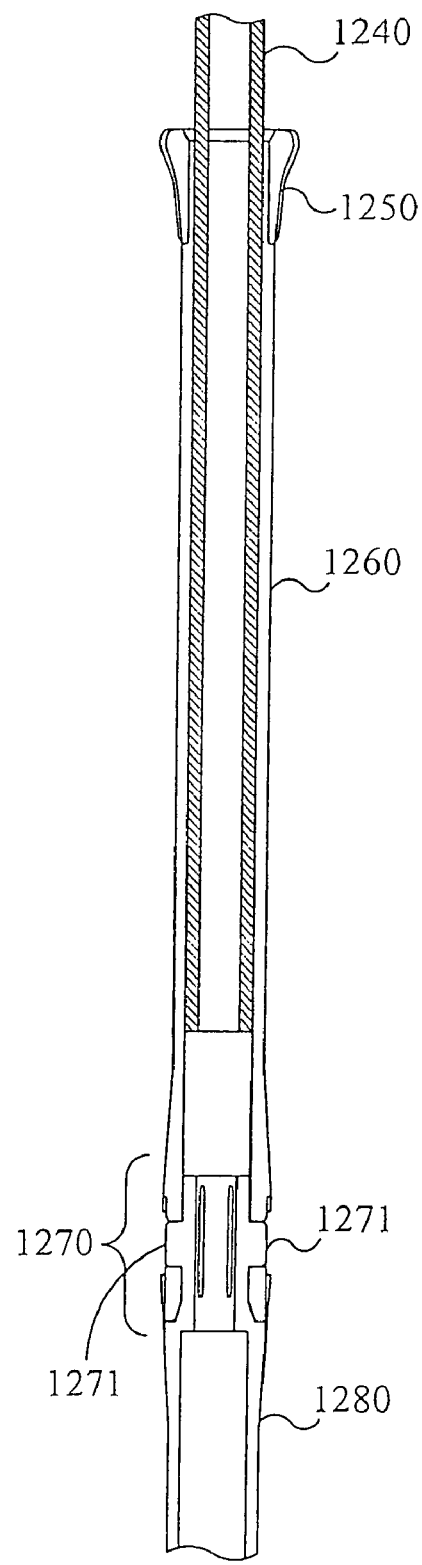
FIG. 14B illustrates a side view detail of the middle section of the bowl lifting and filling apparatus according to some embodiments of the present invention.

FIG. 14B illustrates a side view of the middle section of the bowl lifting and filling apparatus 1200 featuring the telescoping tube 1240, the telescoping lock 1250, a top chute section 1260, the snap connection 1270, the buttons 1271 and the bottom chute section 1280. As shown, the snap connection 1270 comprises two buttons 1271 which, when pressed decouples the top chute section 1260 and the bottom chute section 1280.

Figure 15:
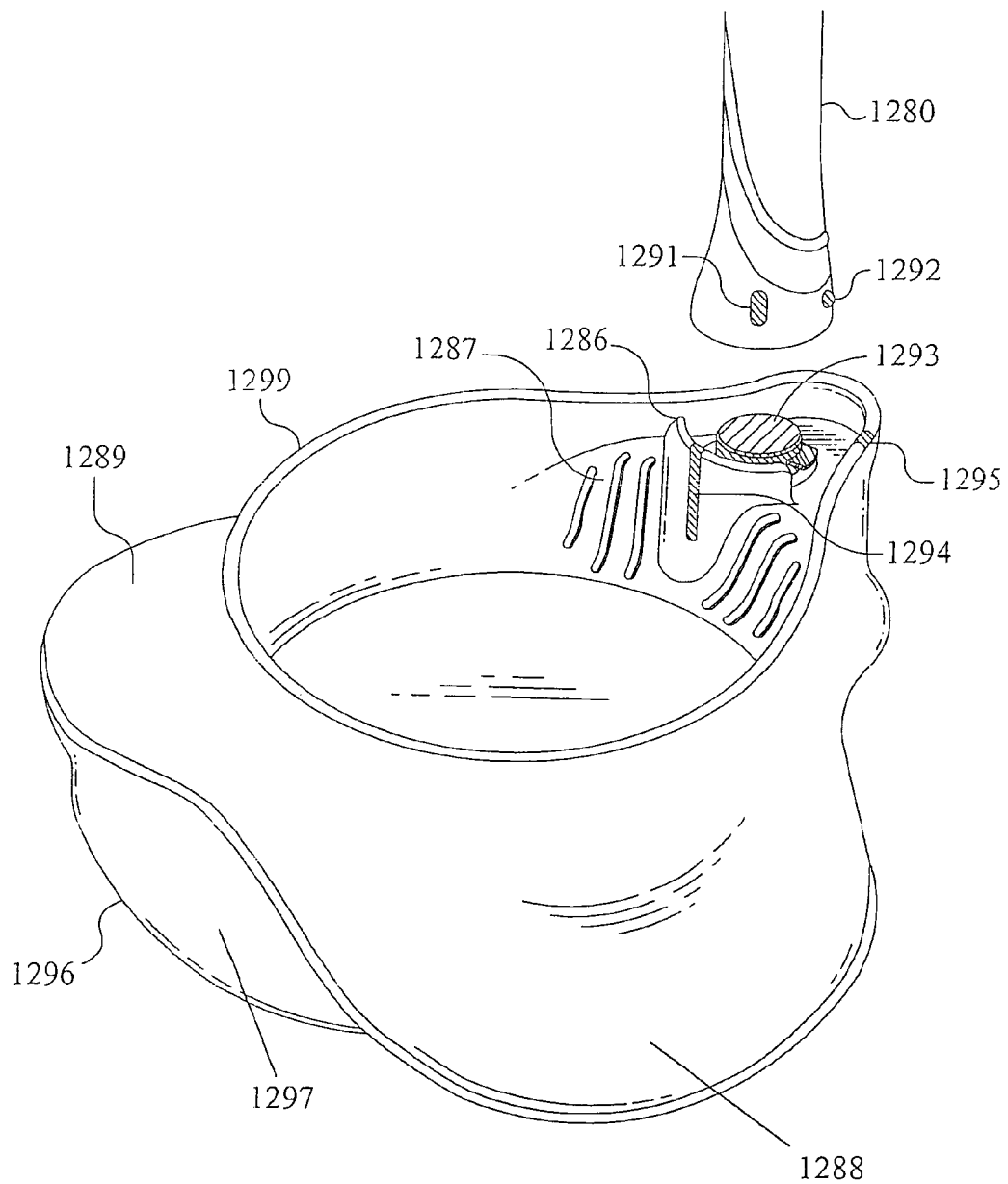
FIG. 15 illustrates a perspective view of the bottom section of the bowl lifting and filling apparatus according to some embodiments of the present invention.

FIG. 15 illustrates a perspective view of the bottom section of the bowl lifting and filling apparatus. In some embodiments of the present invention, the bottom chute section 1280 contains the female end of a coupling device (not shown) and the bowl 1299 has the male end of a coupling device 1293. However, other means of coupling are envisioned including, but not limited to screw threading and tongue and groove coupling.

In some embodiments of the present invention, the coupling device 1293 is located at a raised position relative to the bottom of the bowl 1299 and a wall 1287 slopes down from the coupling device 1293 toward the bottom of the bowl 1299, allowing liquid flowing from the bottom chute 1280 to empty into the bowl 1299. According to this embodiment, food present within the bowl 1299 is unlikely to block or otherwise interfere with coupling and/or decoupling the chute section 1280 from the coupling device 1293. In some embodiments of the present invention, a wall 1286 is positioned between the bowl 1299 and the coupling device 1293. The wall 1286 further protects the coupling device 1293 from blockage.

As shown, the bottom chute section 1280 contains two protrusions 1291, 1292 and the bowl 1299 has two indicators 1294, 1295. According to some embodiments of the present invention, the protrusion 1291 and the indicator 1294, and the protrusion 1292 and the indicator 1295 line up when the bottom chute 1280 is in the proper position to couple with the male end of a coupling device 1293. Once aligned, a user merely needs to rotate the bottom chute section 1280 such that the protrusion 1291 lines up with the indicator 1295 to couple the apparatus. This feature allows a user to easily couple the apparatus without guessing whether the apparatus is coupled properly.

Once coupled, fluid flowing through the bottom chute section 1280 will flow into the bowl 1299. The bowl 1299 further comprises a rubber foot 1296. In some embodiments of the present invention, the rubber foot 1296 extends throughout the underside interior of the bowl 1299. The rubber foot 1296 ensures that the bowl 1299 does not easily move across a slick floor. In some embodiments of the present invention, a space 1297 is provided in the rubber foot 1296. The space 1297 is provided to allow the bowl 1299 to be personalized with a pet's name or other identifying moniker. In some embodiments, this rubber foot 1296 is coupled to the bowl 1299 by a snap fit.

In some embodiments of the present invention, the bowl 1299 includes flanges 1288, 1289. The flanges 1288, 1289 comprise a flared out area which gently slopes to the surface in which the bowl is resting upon. A user is able to place a foot on one of the flanges 1288, 1289 or otherwise put weight on the flanges 1288, 1289 in order to stabilize the bowl 1299 in place while engaging, disengaging or otherwise interacting with the other parts of the bowl filling and lifting apparatus 1200.

Figure 16A:
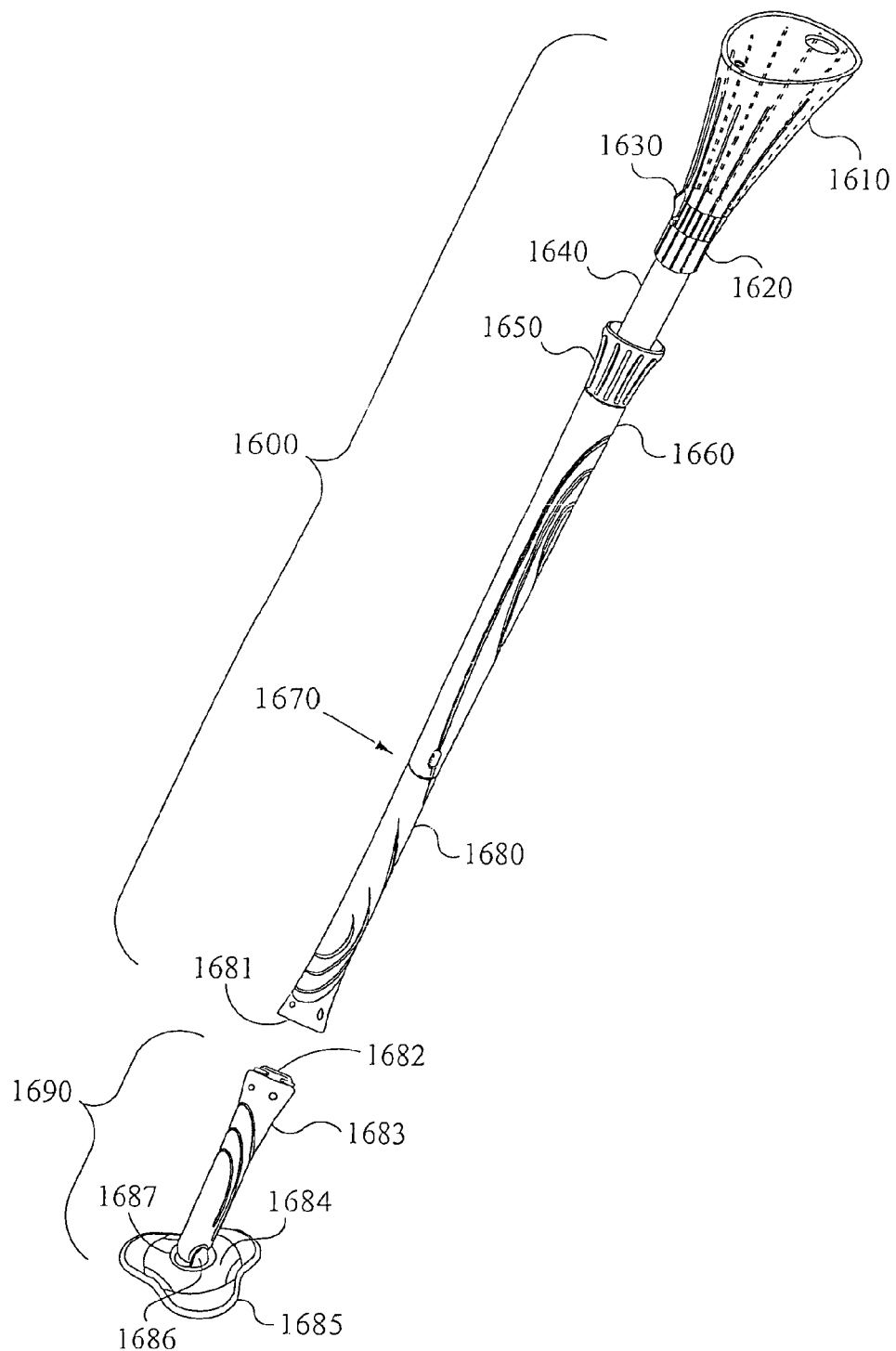
FIG. 16A illustrates a perspective view of a bowl lifting, filling and cleaning apparatus according to some embodiments of the present invention.

FIG. 16A illustrates a schematic perspective view of the upper portion 1600 of the bowl lifting and filling apparatus coupled to a cleaning attachment 1690. The upper portion 1600 includes a container 1610, a container coupling 1620, a valve interface 1630, a telescoping tube 1640, a top chute section 1660, a telescoping tube lock 1650, a bottom chute section 1680, a snap connection 1670, and a bowl/attachment coupling 1681. In some embodiments of the present invention, the bowl/attachment coupling is able to couple the upper portion 1600 with the bowl (not shown) or with the cleaning attachment 1690. The cleaning attachment 1690 includes an upper portion coupling 1682, an extension arm 1683, an arm coupling 1687, a base coupling 1686, a mop base 1684 and a cleaning pad 1685.

Figure 16B:
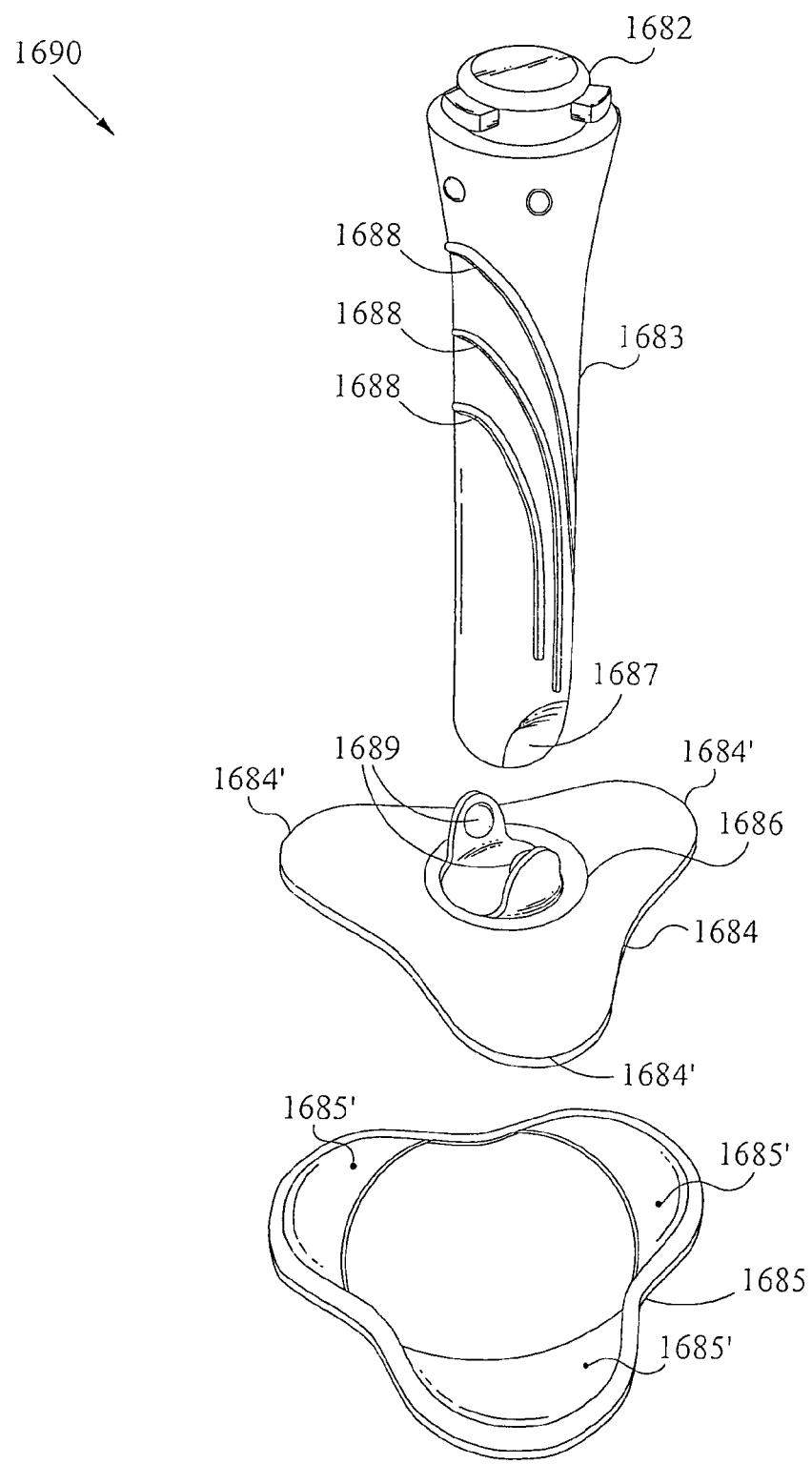
FIG. 16B illustrates a perspective view of the bottom section of the bowl lifting, filling and cleaning apparatus according to some embodiments of the present invention.

FIG. 16B illustrates an exploded, detailed perspective view of the cleaning attachment 1690. The extension arm 1683 has an upper portion coupling 1682, ridges 1688 for easy gripping, and an arm coupling 1687. As shown, the mop base 1684 comprises a substantially flat base with three projections 1684' for coupling with the cleaning pad 1685 and a base coupling 1686 with two partially resilient, inwardly-facing, axially centered protrusions 1689. Although the mop base 1684 is shown with specific coupling devices, it will be readily apparent to those having ordinary skill in the art, that any method of coupling a mop base 1684 to an extension arm 1683 and to a cleaning pad 1685 is equally envisioned. As shown, the cleaning pad 1685 comprises a substantially flat fabric pad with three pockets 1685', and a cleaning surface (not shown) on the underside of the cleaning pad 1685. To couple the mop base 1684 to the cleaning pad 1685, the projections 1684' are simply tucked into the pockets 1685'. In some embodiments of the present invention, the cleaning surface (not shown) of the cleaning pad 1685 is comprised of a microfiber. In other embodiments of the present invention, the cleaning surface (not shown) of the cleaning pad 1685 is comprised of other materials common in the cleaning accessory market.

FIGS. 17A-17C illustrate coupling and axial movement features of the cleaning attachment 1790 according to some embodiments of the present invention. FIG. 17A illustrates a front view of the extension arm 1783 coupled to the mop base 1784 and cleaning pad 1785. As shown, the mop base 1784 couples with the extension arm 1783 by snapping the protrusions 1789 into the arm coupling 1787 (FIGS. 17B and 17C). The arm coupling 1787 (FIGS. 17B and 17C) comprises an aperture extending through the bottom of the extension arm 1783. FIG. 17B illustrates a side view of the extension arm 1783 coupled to the mop base 1784 and the cleaning pad 1785. As shown, the protrusions 1789 act as a single axis, about which the extension arm 1783 has the ability to rotate. FIG. 17C illustrates a side view of the extension arm 1783 coupled to the mop base 1784 and cleaning pad 1785 detailing the rotational movement capabilities of the extension arm 1783 about the protrusions 1789 (indicated by dashed lines).

In use, the bowl filling and lifting apparatus enables a user to easily fill and move a surface-laying bowl without bending. The dual function filling and lifting apparatus has an assembly to allow ease of use. Assembling the filling, lifting and moving apparatus using discrete sections allows a user to customize the apparatus to their height. The telescoping features also achieve customization. These features allow a user to pour fluid into the apparatus and fill the bowl with fluid from a convenient level as well as grip the apparatus at a convenient level and move it without bending. A user can also use the apparatus to lift the bowl and fill the bowl with food. Furthermore, the use of discrete sections allows for easy collapsing of the apparatus for travel or storage.

The various design features facilitate use by users with diminished capabilities. A flared fluid intake facilitates easy use for users with poor eyesight or an unstable hand. The ability to detach the container from the top chute section allows a user with diminished strength to fill the bowl without needing to lift the entire apparatus. Coupling wings and coupling wing channels with rounded corners and graded edges facilitate smooth coupling and decrease the amount of accuracy needed to rotate the body portion. These features allow users with decreased or poor dexterity or limited strength to use the filling and lifting apparatus. Protrusions and indicators further allow those with poor vision the ability to easily couple the chute sections to the bowl. When the coupling socket is attached to the body portion and the coupling plug is located in the bowl, the use of clear plastic allows a user with poor eyesight to line up the coupling mechanisms more easily. The use of handles or anti-slip surfaces allows a user with decreased grip strength to use the filling and lifting apparatus without spilling or dropping. Configurations which allow storage of extra fluid with the filling and lifting apparatus are especially suited for users with poor eyesight who may not be able to see if the bowl is empty. These users can simply add extra fluid without fear that the bowl will overflow. Configurations which make use of a filling cup are especially suited for users who may not have the requisite strength to lift the apparatus or the balance to move a partially filled bowl without spilling fluid. These users are able to fill the bowl simply by lifting the filling cup, filling the filling cup and pouring the fluid from the filling cup into the apparatus. Other distinct usage and design advantages exist in the present invention and will be apparent to one normally skilled in the art.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

What is claimed is:

1. A stand-alone filling, lifting and cleaning kit comprising:
   a bowl with a first coupling device integrally attached to the bowl;
   a substantially hermetic elevating portion supported by the bowl when attached to the bowl comprising:
      a body portion;
      a container removably coupled to a top of the body portion, wherein the weight of the container is supported by the body portion; and
      a bottom end with a second coupling device, wherein the first coupling device removably couples with the second coupling device, wherein the first coupling device removably couples with the second device, and wherein the elevating portion extends substantially vertically upward from the bowl allowing fluid communication between the container and the bowl, wherein the fluid poured into the container flows through the elevating portion into the bowl; and
   a cleaning attachment interchangeably coupled to the body portion, such that the body portion is capable of being decoupled from the bowl and coupled to the cleaning attachment, the cleaning attachment comprising:
      an extension arm having a third coupling device and a mop coupling;
      a mop base having an arm coupling; and
      a cleaning pad, wherein the third coupling device removably couples with the second coupling device, wherein the mop coupling couples with the arm coupling, and wherein the cleaning pad couples with the mop base.

2. The stand-alone filling, lifting and cleaning kit of claim 1, wherein a foot is coupled to the bowl, wherein the foot makes contact with a surface that the bowl is placed upon, and wherein the foot has a higher coefficient of friction than the bowl such that the foot at least partially prevents the bowl from slipping on the surface.

3. The stand-alone filling, lifting and cleaning kit of claim 2, wherein the foot is at least partially comprised of rubber.

4. The stand-alone filling, lifting and cleaning kit of claim 1, wherein the bowl further comprises at least one wall, wherein a portion of the outside of the at least one wall slopes to a surface that the bowl is placed upon, forming a sloping surface such that a user is able to place an object on the sloping surface to secure the bowl in a stationary position.

5. The stand-alone filling, lifting and cleaning kit of claim 1, wherein the bowl contains a first marking, wherein the bottom end contains a second marking, and wherein the first marking and the second marking line up when the first coupling device is properly coupled with the second coupling device.

6. The stand-alone filling, lifting and cleaning kit of claim 1, wherein the body portion comprises at least two collapsible sections.

7. The stand-alone filling, lifting and cleaning kit of claim 6, wherein the body portion further comprises a first collapsible section and a second collapsible section, wherein the first collapsible section comprises a container coupling and a first body coupling, wherein the second collapsible section comprises the second coupling device and a second body coupling, wherein the container coupling couples with the container, wherein the second coupling device couples with the bowl, and wherein the first body coupling couples with the second body coupling, thereby elevating the container and allowing fluid communication between the container and the bowl.

8. The stand-alone filling, lifting and cleaning kit of claim 6, wherein the at least two collapsible sections couple to each other via a push button coupling.

9. The stand-alone filling, lifting and cleaning kit of claim 1, wherein the body portion further comprises:
- a chute section, wherein the chute section comprises a first hollow tube with a first diameter;
- a telescoping section, wherein the telescoping section comprises a second hollow tube with a second diameter, and wherein the top of the telescoping section couples with the container, wherein the first diameter is larger than the second diameter, wherein the telescoping section fits within the chute section, wherein the telescoping section slides through the chute section, further elevating the container; and
- a telescoping lock, wherein the telescoping lock couples with the chute section, and wherein the telescoping lock secures the telescoping section in place at a chosen elevated height.

10. The stand-alone filling, lifting and cleaning kit of claim 9, wherein the telescoping lock comprises a rotating lock such that the rotating lock rotates about an axis parallel with the chute section, such that the telescoping lock secures the telescoping section when the telescoping lock is rotated to a certain position.

11. The stand-alone filling, lifting and cleaning kit of claim 10, wherein the telescoping lock further comprises a first locked position marking, wherein the chute section further comprises a second locked position marking, and wherein the first locked position marking and the second locked position marking line up when the telescoping lock is rotated by an angle sufficient to secure the telescoping section within the chute section.

12. The stand-alone filling, lifting and cleaning kit of claim 1, wherein the body portion further comprises anti-slip ridge features on at least a portion of the body portion.

13. The stand-alone filling, lifting and cleaning kit of claim 1, wherein the container further comprises a lid.

14. The stand-alone filling, lifting and cleaning kit of claim 1, wherein the container further comprises a valve and a valve interface, wherein the valve is substantially hermetically sealed within the container, wherein the valve interface controls the position of the valve from outside the container, and wherein the valve alternatively allows and denies fluid communication between the container and the substantially hermetic elevating portion.

15. The stand-alone filling, lifting and cleaning kit of claim 14, wherein the valve is a ball valve.

16. The stand-alone filling, lifting and cleaning kit of claim 1, wherein the container further comprises anti-slip ridge features on at least a portion of the container.

* * * * *